(12) United States Patent
Gutman et al.

(10) Patent No.: US 12,375,951 B2
(45) Date of Patent: Jul. 29, 2025

(54) COMMUNICATION SECURITY BASED ON FREQUENCY DOMAIN RESIDUAL SIDEBAND CHARACTERISTICS

(71) Applicant: QUALCOMM Incorporated, San Diego, CA (US)

(72) Inventors: Igor Gutman, Hod HaSharon (IL); Yavuz Yapici, Florham Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 17/722,216

(22) Filed: Apr. 15, 2022

(65) Prior Publication Data

US 2023/0337026 A1    Oct. 19, 2023

(51) Int. Cl.
*H04W 12/10* (2021.01)
*H04L 5/00* (2006.01)
*H04W 24/08* (2009.01)

(52) U.S. Cl.
CPC ......... *H04W 24/08* (2013.01); *H04L 5/0048* (2013.01)

(58) Field of Classification Search
CPC ........ H04B 1/30; H04B 1/68; H04B 10/5165; H04B 17/21; H04B 17/26; H03C 3/00; H04L 5/0048; H04L 27/366; H04L 27/3863; H04W 12/108; H04W 12/122; H04W 12/79; H04W 24/08; H04W 80/02
See application file for complete search history.

(56) References Cited

U.S. PATENT DOCUMENTS

| | | | | |
|---|---|---|---|---|
| 8,588,336 B2* | 11/2013 | Johansson | ............. | H04L 27/364 |
| | | | | 375/302 |
| 11,395,136 B2* | 7/2022 | Yunusov | ............... | H04L 9/0838 |
| 11,757,694 B1* | 9/2023 | Yapici | .................... | H04L 27/38 |
| | | | | 375/262 |

(Continued)

FOREIGN PATENT DOCUMENTS

WO    WO-2017053908 A1    3/2017

OTHER PUBLICATIONS

International Search Report and Written Opinion—PCT/US2023/065703—ISA/EPO—Jul. 20, 2023.

(Continued)

*Primary Examiner* — Frank Duong
(74) *Attorney, Agent, or Firm* — Holland & Hart LLP

(57) ABSTRACT

Methods, systems, and devices for wireless communication are described. In some systems, a second network entity (e.g., a transmitting device) may transmit first signaling to a second network entity (e.g., a receiving device) to indicate one or more frequency domain residual sideband (FDRSB) parameters associated with the second network entity. The FDRSB parameters may be associated with an imbalance between an in-phase component and a quadrature phase component of the first signaling. The second network entity may generate and transmit second signaling that is configured to have the one or more FDRSB characteristics. The first network entity may determine whether the second network entity is a source of the second signaling based on the one or more FDRSB characteristics of the second signaling and the one or more FDRSB parameters indicated by the first signaling.

30 Claims, 18 Drawing Sheets

(56) References Cited

U.S. PATENT DOCUMENTS

2017/0093458 A1* 3/2017 Rafique .................. H04B 1/68
2021/0092593 A1  3/2021 Yunusov et al.

OTHER PUBLICATIONS

Wong L.J., et al., "Specific Emitter Identification Using Convolutional Neural Network-Based IQ Imbalance Estimators", IEEE Access, vol. 7, Mar. 26, 2019, pp. 33544-33555, XP011716386, DOI:10.1109/ACCESS.2019.2903444, Abstract, Paragraphs [OOI.]-[OII.].

* cited by examiner

COMMUNICATION SECURITY BASED ON FREQUENCY DOMAIN RESIDUAL SIDEBAND CHARACTERISTICS

FIELD OF TECHNOLOGY

The following relates to wireless communication, including communication security based on frequency domain residual sideband (FDRSB) characteristics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, wireless communications may be encrypted using cryptographic algorithms to protect the enclosed data. Due to latency considerations, some wireless communications systems may encrypt higher layer signaling (e.g., Layer 3 communications, such as radio resource control (RRC) signaling) and may not encrypt other wireless signaling (e.g., Layer 1 signaling, which may be physical layer signaling). However, such cryptographic algorithms may increase overhead and may be susceptible to being hacked using quantum computing techniques.

SUMMARY

The described techniques relate to improved methods, systems, devices, and apparatuses that support communication security based on frequency domain residual sideband (FDRSB) characteristics. For example, the described techniques provide for a first network entity (e.g., a receiving device) to identify a source of a received signal based on one or more FDRSB characteristics of the received signal. A second network entity (e.g., a transmitting device) may transmit first signaling to the first network entity to indicate one or more FDRSB parameters associated with the second network entity. The one or more FDRSB parameters may be associated with an imbalance between an in-phase component of the first signaling and a quadrature phase component of the first signaling. The second network entity may generate and transmit second signaling having one or more FDRSB characteristics. The first network entity may decode the second signaling and the one or more FDRSB characteristics based on the one or more FDRSB parameters indicated via the first signaling. The first network entity may determine whether the second network entity is the source of the second signaling based on the one or more FDRSB parameters and the one or more FDRSB characteristics of the second signaling.

If the first network entity determines that the second network entity is not the source of the second signaling, the first network entity may ignore the second signaling or may transmit an indication to the second network entity to indicate a potential intruder. The first network entity may thus reduce processing and power consumption by refraining from responding to the intruder signal. If the first network entity determines that the second network entity is the source of the second signaling, the first network entity may communicate with the second network entity accordingly, which may improve security, reliability, and coordination between devices. The first network entity and the second network entity may represent examples of a user equipment (UE), a base station, a network node, or any other wireless devices.

A method for wireless communication at a first network entity is described. The method may include receiving first signaling that indicates one or more FDRSB parameters associated with a second network entity, the one or more FDRSB parameters associated with an imbalance between an in-phase component of the first signaling and a quadrature phase component of the first signaling, receiving second signaling, determining whether the second network entity is a source of the second signaling based on one or more FDRSB characteristics of the second signaling and the one or more FDRSB parameters indicated by the first signaling, and communicating with the second network entity based on determining that the second network entity is the source of the second signaling.

An apparatus for wireless communication at a first network entity is described. The apparatus may include a processor, memory coupled with the processor, and instructions stored in the memory. The instructions may be executable by the processor to cause the apparatus to receive first signaling that indicates one or more FDRSB parameters associated with a second network entity, the one or more FDRSB parameters associated with an imbalance between an in-phase component of the first signaling and a quadrature phase component of the first signaling, receive second signaling, determine whether the second network entity is a source of the second signaling based on one or more FDRSB characteristics of the second signaling and the one or more FDRSB parameters indicated by the first signaling, and communicate with the second network entity based on determining that the second network entity is the source of the second signaling.

Another apparatus for wireless communication at a first network entity is described. The apparatus may include means for receiving first signaling that indicates one or more FDRSB parameters associated with a second network entity, the one or more FDRSB parameters associated with an imbalance between an in-phase component of the first signaling and a quadrature phase component of the first signaling, means for receiving second signaling, means for determining whether the second network entity is a source of the second signaling based on one or more FDRSB characteristics of the second signaling and the one or more FDRSB parameters indicated by the first signaling, and means for communicating with the second network entity based on determining that the second network entity is the source of the second signaling.

A non-transitory computer-readable medium storing code for wireless communication at a first network entity is described. The code may include instructions executable by a processor to receive first signaling that indicates one or more FDRSB parameters associated with a second network entity, the one or more FDRSB parameters associated with an imbalance between an in-phase component of the first signaling and a quadrature phase component of the first signaling, receive second signaling, determine whether the second network entity is a source of the second signaling based on one or more FDRSB characteristics of the second signaling and the one or more FDRSB parameters indicated by the first signaling, and communicate with the second network entity based on determining that the second network entity is the source of the second signaling.

Some examples of the method, apparatuses, and non-transitory computer-readable medium described herein may further include operations, features, means, or instructions for decoding the second signaling based on the one or more FDRSB parameters, where the one or more FDRSB parameters include one or more filter parameters for decoding the second signaling based on filtering the one or more FDRSB characteristics of the second signaling.

In some examples of the method, apparatuses, and non-transitory computer-readable medium described herein, determining whether the second network entity is the source of the second signaling may include operations, features, means, or instructions for determining whether the second network entity is the source of the second signaling based on comparing one or more characteristics of the decoded second signaling to one or more characteristics of signaling previously received from the second network entity.

Some examples of the method, apparatuses, and non-transitory computer-readable medium described herein may further include operations, features, means, or instructions for receiving third signaling from the second network entity, the third signaling lacking the one or more FDRSB characteristics, measuring a first metric associated with the third signaling, measuring a second metric associated with the second signaling after decoding the second signaling, and comparing a difference between the first metric and the second metric with a threshold difference, where determining that the source of the second signaling may be the second network entity may be based on the difference being less than the threshold difference.

Some examples of the method, apparatuses, and non-transitory computer-readable medium described herein may further include operations, features, means, or instructions for receiving, from the second network entity, a radio resource control (RRC) message or a medium access control-control element (MAC-CE) that indicates the threshold difference.

Some examples of the method, apparatuses, and non-transitory computer-readable medium described herein may further include operations, features, means, or instructions for transmitting, to the second network entity, a message that indicates the difference between the first metric and the second metric. In some examples of the method, apparatuses, and non-transitory computer-readable medium described herein, the first metric and the second metric may be signal quality metrics.

In some examples of the method, apparatuses, and non-transitory computer-readable medium described herein, receiving the first signaling may include operations, features, means, or instructions for receiving a pilot signal, where the one or more FDRSB parameters include one or more FDRSB characteristics of the pilot signal. Some examples of the method, apparatuses, and non-transitory computer-readable medium described herein may further include operations, features, means, or instructions for storing the one or more FDRSB characteristics of the pilot signal in a memory of the first network entity.

In some examples of the method, apparatuses, and non-transitory computer-readable medium described herein, determining whether the second network entity is the source of the second signaling may include operations, features, means, or instructions for determining the one or more FDRSB characteristics of the second signaling, determining a difference between the one or more FDRSB characteristics of the second signaling and the one or more FDRSB characteristics of the pilot signal, and determining that the second network entity may be the source of the second signaling based on the difference being less than a threshold difference.

Some examples of the method, apparatuses, and non-transitory computer-readable medium described herein may further include operations, features, means, or instructions for receiving, from the second network entity, an RRC message or a MAC-CE that indicates the threshold difference.

Some examples of the method, apparatuses, and non-transitory computer-readable medium described herein may further include operations, features, means, or instructions for receiving, from the second network entity, control signaling that indicates an index of the pilot signal, where receiving the pilot signal includes receiving, from the second network entity, a set of multiple pilot signals including the pilot signal, other pilot signals of the set of multiple pilot signals different than the pilot signal may have different FDRSB characteristics than the one or more FDRSB characteristics of the pilot signal, and storing the one or more FDRSB characteristics of the pilot signal in the memory of the first network entity may be based on the control signaling indicating the index of the pilot signal.

In some examples of the method, apparatuses, and non-transitory computer-readable medium described herein, the second signaling includes physical layer signaling.

A method for wireless communication at a second network entity is described. The method may include transmitting first signaling that indicates one or more FDRSB parameters associated with the second network entity, the one or more FDRSB parameters associated with an imbalance between an in-phase component of the first signaling and a quadrature phase component of the first signaling, generating second signaling that is configured to have one or more FDRSB characteristics, and transmitting the second signaling, where the second network entity is identifiable as a source of the second signaling based on the second signaling having the one or more FDRSB characteristics and further based at least in part the one or more FDRSB parameters indicated by the first signaling.

An apparatus for wireless communication at a second network entity is described. The apparatus may include a processor, memory coupled with the processor, and instructions stored in the memory. The instructions may be executable by the processor to cause the apparatus to transmit first signaling that indicates one or more FDRSB parameters associated with the second network entity, the one or more FDRSB parameters associated with an imbalance between an in-phase component of the first signaling and a quadrature phase component of the first signaling, generate second signaling that is configured to have one or more FDRSB characteristics, and transmit the second signaling, where the second network entity is identifiable as a source of the second signaling based on the second signaling having the one or more FDRSB characteristics and further based at least in part the one or more FDRSB parameters indicated by the first signaling.

Another apparatus for wireless communication at a second network entity is described. The apparatus may include means for transmitting first signaling that indicates one or more FDRSB parameters associated with the second network entity, the one or more FDRSB parameters associated with an imbalance between an in-phase component of the first signaling and a quadrature phase component of the first signaling, means for generating second signaling that is configured to have one or more FDRSB characteristics, and means for transmitting the second signaling, where the second network entity is identifiable as a source of the second signaling based on the second signaling having the one or more FDRSB characteristics and further based at least in part the one or more FDRSB parameters indicated by the first signaling.

A non-transitory computer-readable medium storing code for wireless communication at a second network entity is described. The code may include instructions executable by a processor to transmit first signaling that indicates one or more FDRSB parameters associated with the second network entity, the one or more FDRSB parameters associated with an imbalance between an in-phase component of the first signaling and a quadrature phase component of the first signaling, generate second signaling that is configured to have one or more FDRSB characteristics, and transmit the second signaling, where the second network entity is identifiable as a source of the second signaling based on the second signaling having the one or more FDRSB characteristics and further based at least in part the one or more FDRSB parameters indicated by the first signaling.

In some examples of the method, apparatuses, and non-transitory computer-readable medium described herein, the one or more FDRSB parameters include one or more filter parameters for decoding the second signaling based on filtering the one or more FDRSB characteristics of the second signaling.

In some examples of the method, apparatuses, and non-transitory computer-readable medium described herein, generating the second signaling may include operations, features, means, or instructions for deactivating, bypassing, or refraining from using a cancellation component configured to cancel the one or more FDRSB characteristics, where the second signaling may be configured to may have the one or more FDRSB characteristics based on deactivating, bypassing, or refraining from using the cancellation component.

In some examples of the method, apparatuses, and non-transitory computer-readable medium described herein, generating the second signaling may include operations, features, means, or instructions for removing one or more first FDRSB characteristics from the second signaling and applying, before or after removing the one or more first FDRSB characteristics, the one or more FDRSB characteristics to the second signaling.

Some examples of the method, apparatuses, and non-transitory computer-readable medium described herein may further include operations, features, means, or instructions for generating third signaling that may be configured to lack the one or more FDRSB characteristics, transmitting the third signaling, and transmitting control signaling that indicates a threshold difference between a first metric associated with the second signaling and a second metric associated with the third signaling, where the second network entity may be identifiable as the source of the second signaling based on a difference between the first metric and the second metric being less than the threshold difference.

Some examples of the method, apparatuses, and non-transitory computer-readable medium described herein may further include operations, features, means, or instructions for receiving a message that indicates the difference between the first metric and the second metric. In some examples of the method, apparatuses, and non-transitory computer-readable medium described herein, the control signaling includes an RRC message or a MAC-CE.

In some examples of the method, apparatuses, and non-transitory computer-readable medium described herein, transmitting the first signaling may include operations, features, means, or instructions for transmitting a pilot signal, where the one or more FDRSB parameters include one or more FDRSB characteristics of the pilot signal, and where the second network entity may be identifiable as the source of the second signaling based on a difference between the one or more FDRSB characteristics of the second signaling and the one or more FDRSB characteristics of the pilot signal being less than a threshold difference.

Some examples of the method, apparatuses, and non-transitory computer-readable medium described herein may further include operations, features, means, or instructions for transmitting control signaling that indicates an index of the pilot signal, where transmitting the pilot signal includes transmitting a set of multiple pilot signals including the pilot signal, other pilot signals of the set of multiple pilot signals different than the pilot signal may be configured to may have different FDRSB characteristics than the one or more FDRSB characteristics of the pilot signal, and the pilot signal may be identifiable from among the set of multiple pilot signals based on the index.

Some examples of the method, apparatuses, and non-transitory computer-readable medium described herein may further include operations, features, means, or instructions for transmitting an RRC message or a MAC-CE that indicates the threshold difference. In some examples of the method, apparatuses, and non-transitory computer-readable medium described herein, the second signaling includes physical layer signaling.

DETAILED DESCRIPTION

Figure 1:
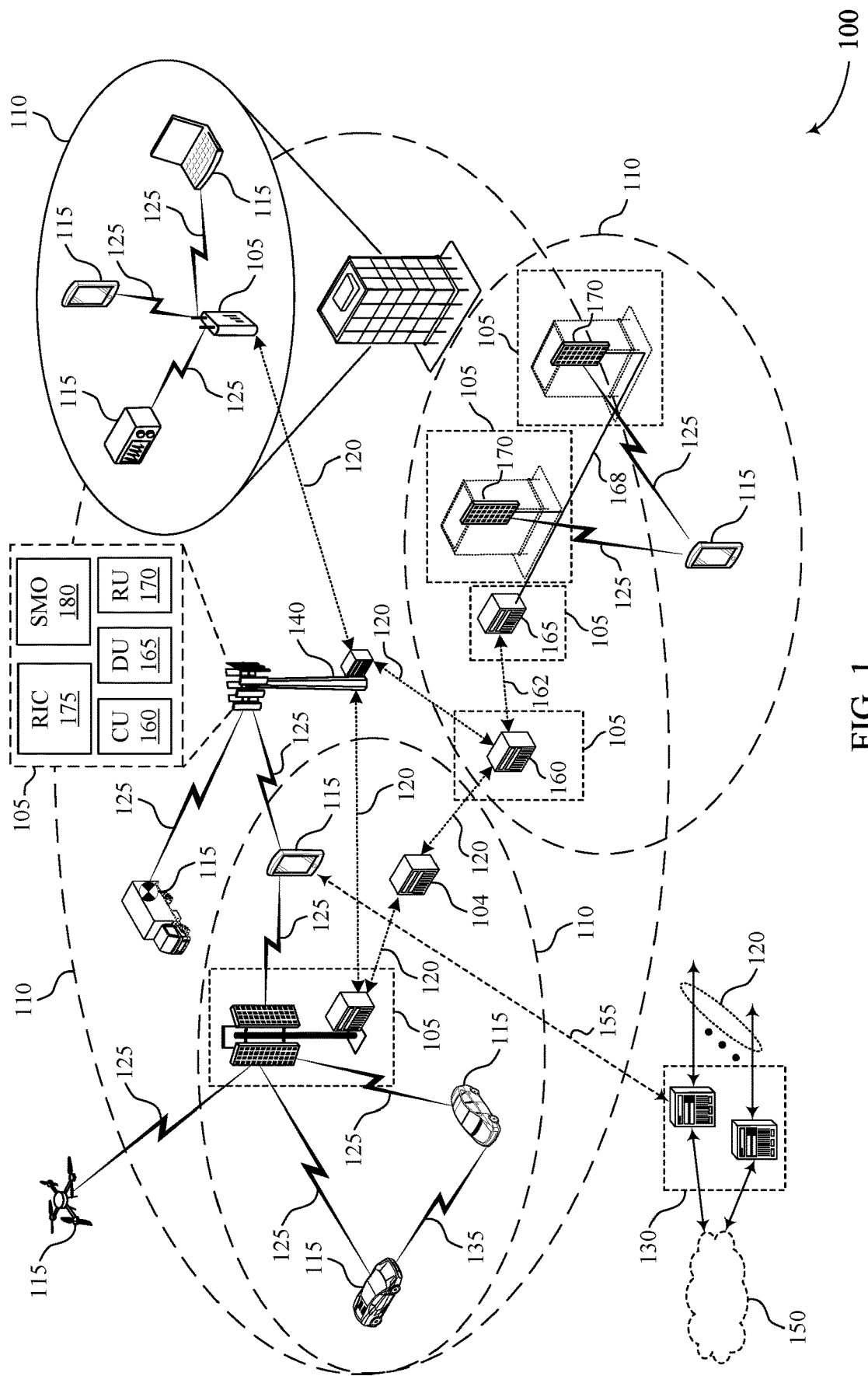
FIG. 1 illustrates an example of a wireless communications system that supports communication security based on frequency domain residual sideband (FDRSB) characteristics in accordance with one or more aspects of the present disclosure.

In some systems, wireless communications between devices may be secured based on encryption. For example, wireless signals and messages may be encrypted using cryptographic algorithms to protect the enclosed data. However, such cryptographic algorithms may increase overhead and may be susceptible to being hacked using quantum computing techniques, or other advanced computing techniques. Additionally, or alternatively, due to latency considerations associated with such encryption, some wireless communications systems may encrypt higher layer signaling (e.g., Layer 3 communications, such as radio resource control (RRC) signaling) and may not encrypt other wireless signaling (e.g., Layer 1 signaling, which may be physical layer signaling). If the cryptographic algorithms for the higher layer communications are hacked, communication reliability and throughput will decrease. As such, some systems and devices may place a relatively large load on the security of higher layer communications using relatively complex algorithms.

Techniques described herein provide for improved security of wireless communications with reduced complexity and overhead. For example, the described techniques support utilization of a frequency domain residual sideband (FDRSB) impairment to provide for increased security for wireless communications, including physical layer security. The FDRSB impairment may include one or more FDRSB characteristics that correspond to an imbalance between an in-phase component and a quadrature phase component of a signal. As used herein, FDRSB may refer to frequency dependent residual sideband characteristics, non-frequency-dependent residual sideband characteristics, or both. The FDRSB impairment may occur during generation of a signal at a transmitting device. The described techniques provide for a receiving device to identify a source of a received signal based on one or more FDRSB parameters indicated to the receiving device and one or more FDRSB characteristics of the received signal.

The FDRSB characteristics may be estimated or modeled by a linear function. For example, a device may use a set of linear filters associated with a mixture of the in-phase and quadrature phase components of the signal to estimate and reduce or mitigate the FDRSB. In some examples, the transmitting device may refrain from mitigating the FDRSB prior to transmission of a signal (e.g., the signal may be transmitted with the natural FDRSB of the transmitter, which may alternatively be referred to as the raw FDRSB of the transmitter). The transmitting device may transmit a control signal to the receiving device to indicate filter parameters for the receiving device to use to decode or descramble the FDRSB. The receiving device may descramble the FDRSB and identify that the source of the signal is the transmitting device based on a unique FDRSB signature of the transmitting device.

Alternatively, the transmitting device may intentionally apply an added (e.g., artificial) FDRSB impairment to a signal prior to transmission. In some cases, the transmitting device may transmit an indication of filter parameters for the receiving device to use to decode the artificial FDRSB. The receiving device may decode the signal and descramble the added FDRSB from the data included in the signal based on the filter parameters. The receiving device may compare a metric (e.g., signal-to-noise ratio (SNR), or some other signal quality metric) of the signal with a metric of a second signal from the transmitting device. If a difference between the metrics is less than a threshold, the receiving device may determine that the transmitting device is the proper source of the signal. In some other cases, the transmitting device may transmit a pilot signal, such as a security reference signal (SERS), with the artificial FDRSB impairment, and the receiving device may compare an artificial FDRSB impairment on a received signal with the artificial FDRSB impairment on the pilot signal to identify the source of the received signal.

Aspects of the disclosure are initially described in the context of wireless communications systems. Additional aspects of the disclosure are described with reference to a transmission circuitry diagram, a filter diagram, flow diagrams, and a process flow. Aspects of the disclosure are further illustrated by and described with reference to apparatus diagrams, system diagrams, and flowcharts that relate to communication security based on FDRSB characteristics.

FIG. 1 illustrates an example of a wireless communications system 100 that supports communication security based on FDRSB characteristics in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support communication security based on FDRSB characteristics as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

As described herein, a first network entity 105 (e.g., a receiving device) in the wireless communications system 100 may identify a source of a received signal based on one or more FDRSB characteristics of the received signal. A second network entity 105 (e.g., a transmitting device) may transmit first signaling to the first network entity 105 to indicate one or more FDRSB parameters associated with the second network entity 105. The one or more FDRSB parameters may be associated with an imbalance between an in-phase component of the first signaling and a quadrature phase component of the first signaling. The second network entity 105 may generate and transmit second signaling having one or more FDRSB characteristics. The first network entity 105 may decode the second signaling and the one or more FDRSB characteristics based on the one or more FDRSB parameters indicated via the first signaling. The first network entity 105 may determine whether the second network entity 105 is the source of the second signaling based on the one or more FDRSB parameters and the one or more FDRSB characteristics of the second signaling.

If the first network entity 105 determines that the second network entity 105 is not the source of the second signaling, the first network entity 105 may ignore the second signaling or may transmit an indication to the second network entity 105 to indicate a potential intruder. The first network entity 105 may thus reduce processing and power consumption by refraining from responding to the intruder signal. If the first network entity 105 determines that the second network entity 105 is the source of the second signaling, the first network entity 105 may communicate with the second network entity 105 accordingly, which may improve security, reliability, and coordination between devices. The first network entity 105 and the second network entity 105 may, in some aspects, represent examples of a UE 115, a base station 140, a CU 160, a DU 165, and an RU 175, an IAB node 104, some other network node, or any other wireless devices in the wireless communications system 100.

Figure 2:
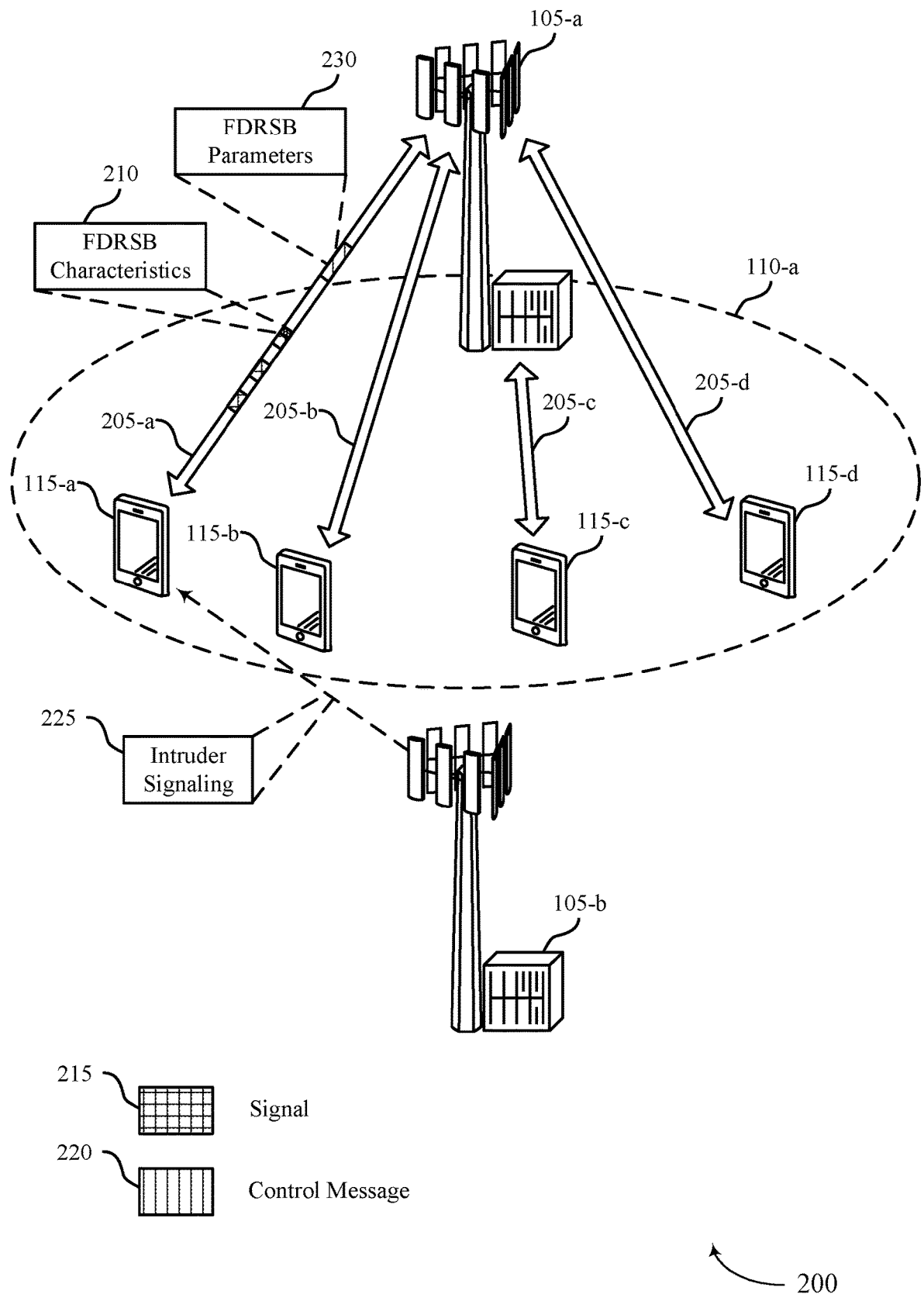
FIG. 2 illustrates an example of a wireless communications system that supports communication security based on FDRSB characteristics in accordance with one or more aspects of the present disclosure.

FIG. 2 illustrates an example of a wireless communications system 200 that supports communication security based on FDRSB characteristics in accordance with one or more aspects of the present disclosure. The wireless communications system 200 may implement or be implemented by aspects of the wireless communications system 100. For example, the wireless communications system 200 may include a network entity 105-*a*, a network entity 105-*b*, an UEs 115-*a*, 115-*b*, 115-*c*, and 115-*d*, which may represent examples of corresponding devices as described with reference to FIG. 1. The network entity 105-*a* may communicate with each of the UEs 115-*a*, 115-*b*, 115-*c*, and 115-*d* within a geographic coverage area 110-*a* and via a respective communication link 205 (e.g., communication links 205-*a*, 205-*b*, 205-*c*, and 205-*d*). As described herein, the network entity 105-*a* may apply an FDRSB signature to transmissions to the UEs 115, which may secure the transmissions by identifying the network entity 105-*a* as a source of the transmissions.

Security of wireless communications may improve reliability and confidentiality of exchanged data. By securing a transmission, a device may protect confidential information enclosed in the transmission, such as information related to commercial applications (e.g., financial, medical, or pharmaceutical information), government organizations, military applications, personal data, and social networks, among other confidential and private information. In some wireless communications systems, link security may be performed using cryptography. For example, cryptographic algorithms may be used to provide security via higher layers (e.g., Layer 3 and above). Such cryptographic algorithms are relatively difficult and time consuming to hack (e.g., unbreakable).

However, a security key may be transmitted to use for decoding the cryptographic algorithms, which may increase overhead and latency. For example, the security key may include a relatively large quantity of bits (e.g., 256 or 128 bits), which may add overhead to relatively small data packets. Additionally, or alternatively, some quantum computing technologies may be developed which may be capable of reducing complexity associated with decoding (e.g., hacking) the cryptographic algorithms. Quantum mechanics may make use of superposition features and/or quantum bit features, which may exist in a combination of multiple states at a time. Such techniques may reduce a hacking complexity of an exhaustive search method, which may pose a risk to security of cryptographic algorithms.

Some wireless communications may not be protected by cryptography. For example, some scheduled downlink transmissions may not be protected by cryptography to reduce overhead and latency. Such downlink transmissions may include lower layer transmissions (e.g., Layer 1 or Physical Layer transmissions), such as a medium access control-control element (MAC-CE), a broadcast message (e.g., a system information block (SIB), paging information, or the like), or both. A transfer delay of a MAC-CE transmission may be more important than reliability of the transmission, in some cases. In such cases, one or more intruding devices may challenge (e.g., hijack or hack) the unprotected transmissions. For example, an intruding device may fabricate a transmission having a same format as the original (e.g., true) physical downlink control channel (PDCCH), physical downlink shared channel (PDSCH), physical uplink control channel (PUCCH), or physical uplink shared channel (PUSCH) transmission. Absent security on the transmissions, a UE 115 or other receiving device may not distinguish between a true transmission and a fabricated transmission, which may reduce reliability and pose security threats.

In the example of FIG. 2, the intruding network entity 105-*b* may transmit intruder signaling 225 to the UE 115-*a* (e.g., and/or one or more of the other UEs 115-*b*, 115-*c*, and 115-*d*). The UE 115-*a* may, in some cases, be unable to distinguish the intruder signaling 225 from one or more true signals 215 from the network entity 105-*a*.

An example of intruder signaling 225 may be a fabricated wake-up signal (WUS), which may be fabricated by an intruding device to drain battery power of one or more UEs 115. A WUS may be transmitted by a network entity 105 to a UE 115 via a PDCCH during discontinued reception (DRX) communications. The WUS may indicate whether the UE 115 should stay on (e.g., in a wake state) to receive data or transition to a sleep state for a subsequent DRX on duration. A wake-up radio may be used for detection of the WUS. For example, the UE 115 may remain in a relatively low power state while monitoring for a WUS using the wake-up radio. The UE 115 may not enter a full power state until the UE 115 receives a WUS that instructs the UE 115 to wake up. Such wake-up techniques may be referred to as two-stage wake-up, where the monitoring for the WUS may correspond to a first stage. The first stage of the wake-up may provide for reduced sensitivity to phase noise or receiver nonlinearities, relatively low SNR and/or dynamic range at a digital front end (DFE), reduced bandwidth or search space, and improved topology (e.g., voltage levels and clock frequencies of the hardware). Thus, WUS techniques may reduce power consumption by the UE 115 as compared with scenarios in which the UE 115 remains in an on state.

However, in some cases, the first stage of the WUS may be transmitted via lower layer signaling (e.g., a demodulation reference signal (DMRS) of a PDCCH transmission) that may be unencrypted. As such, an intruder device, such as the network entity 105-*b*, may hack the first stage of the WUS and transmit a fabricated WUS to one or more UEs 115 (e.g., the intruder signaling 225). The fabricated WUS may instruct a UE 115 to remain awake, which may quickly drain a battery of the UE 115. Additionally, or alternatively, the fabricated WUS may wake up multiple UEs 115 in a network at a time (e.g., each of the UEs 115-*a*, 115-*b*, 115-*c*, and 115-*d*), which may cause congestion in the network, a crash of the network, or other network instabilities.

To secure lower layer transmissions, a transmitting device, such as the network entity 105-*a* described herein, may apply (e.g., or refrain from removing) a physical layer impairment to a transmission. The physical layer impairment may be known to the transmitting device and an intended receiving device, such as the UE 115-*a*, but not to other devices. For example, the network entity 105-*a* may transmit a control message 220 or other signaling that indicates the physical layer impairment to the UE 115-*a* via encrypted signaling (e.g., Layer 3 signaling) when the UE 115-*a* is awake. The UE 115-*a* may store the indication of the physical layer impairment and use the impairment to determine whether subsequent signals 215 received by the UE 115-*a* are from the network entity 105-*a* or an intruding device. If the impairment on a signal 215 received at the UE 115-*a* does not match the expected impairment, the UE 115-*a* may drop the slot in which the signal 215 is received, transmit an indication of the intruder signaling 225 to the network entity 105-*a* (e.g., declare a bridge attempt), or both.

Such lower layer security may add an additional layer of security (e.g., on top of upper layer encryption) to reduce threats of advanced computing techniques. Additionally, or alternatively, the lower layer security may increase link reliability by protecting a control channel, improve security and reliability of lower layer communications, such as wake-up signaling, reduce overhead and latency by reducing a security load associated with upper layer encryption, or any combination thereof. In some cases, the applied impairment may be an amplitude-to-phase (AM/PM) impairment. An AM/PM impairment may be applied as a physical layer signature of a transmitting device without consuming power. However, an AM/PM impairment may affect performance of wireless communications. For example, even if known and removed by a receiver, the AM/PM impairment may result in some reduction in signal quality (e.g., an SNR penalty).

Techniques described herein provide for improved security of wireless communications with reduced overhead while maintaining performance. For example, the network entity 105-*a* (e.g., a transmitting device) may secure transmissions using a physical layer signature that is based on an FDRSB impairment to provide for increased security for wireless communications, including physical layer security. The FDRSB impairment may correspond to an imbalance between an in-phase component (e.g., a real part) and a quadrature phase component (e.g., an imaginary part) of a signal 215. The described techniques provide for a UE 115 to identify a source of a received signal 215 based on one or more FDRSB parameters 230 indicated to the UE 115 and one or more FDRSB characteristics 210 of a received signal 215.

The FDRSB impairment may occur during generation of a signal 215 at the network entity 105-*a*. In some aspects, the FDRSB impairment may occur naturally, and the network entity 105-*a* may refrain from removing the FDRSB impairment prior to transmission of the signal 215. Additionally, or alternatively, the network entity 105-*a* may intentionally apply an added (e.g., artificial) FDRSB impairment to a signal 215 prior to transmission. The FDRSB impairment of a signal 215 may be referred to as FDRSB characteristics or an FDRSB signature herein. In some aspects, the FDRSB characteristics may be scrambled with the data or other information included in the signal 215. Generation of the FDRSB impairment by a transmitting device is described in further detail elsewhere herein, including with reference to FIG. 3.

The FDRSB characteristics 210 of a signal 215 may be estimated or modeled by a linear function. For example, a device may use a set of linear filters associated with a mixture of the in-phase and quadrature phase components of the signal 215 to estimate and reduce or mitigate the FDRSB characteristics 210. The network entity 105-*a* may transmit a control message 220 to the UE 115-*a* (e.g., and/or one or more other intended receiving UEs 115) to indicate filter parameters for the receiving device to use to decode or descramble the FDRSB characteristics 210. The control message 220 may be an RRC message, a MAC-CE, or some other control message 220 (e.g., Layer 2 or Layer 3 signaling). In some aspects, the FDRSB parameters 230 indicated by the control message 220 may include the filter parameters. The UE 115-*a* may descramble the FDRSB characteristics 210 from the signal 215 based on the filter parameters. The UE 115-*a* may identify that the source of the signal 215 is the network entity 105-*a* based on a unique FDRSB signature of the network entity 105-*a*. Filters for modeling the FDRSB characteristics 210 are described in further detail elsewhere herein, including with reference to FIG. 4.

The network entity 105-*a* may transmit multiple signals 215 to the UE 115-*a*. One or more of the signals 215 may include the FDRSB characteristics 210. The network entity 105-*a* may remove FDRSB from one or more other signals 215, such that the one or more other signals 215 may not include the FDRSB characteristics 210, or may include reduced FDRSB characteristics 210. The UE 115-*a* may compare signal metrics of the one or more other signals 215 with signal metrics of the one or more signals 215 having the FDRSB characteristics 210 to determine or identify a source of the signals 215 having the FDRSB characteristics 210. In other words, the UE 115-*a* may verify or confirm that the signals 215 having the FDRSB characteristics 210 are not fabricated by an intruder entity. The signals 215 may include any data traffic (e.g., physical layer or upper layer traffic), such as DMRSs, data packets, pilot signals, reference signals (e.g., SERS), or any combination thereof. Techniques for comparing signal metrics of the signals 215 are described in further detail with reference to FIGS. 5-7.

The described techniques for FDRSB-based security may be applied to downlink communications, uplink communications, sidelink communications, or some other type of communication link. For example, in an industrial IoT (IIoT) scenario, a factory node or device may transmit one or more reports to a controller. The factory node may secure the transmissions using the described FDRSB techniques such that an intruder may not generate fraudulent reports that may disturb the factory operations.

Thus, one or more devices in the wireless communications system 200 may apply FDRSB characteristics 210 to a signal 215 to secure the information included in the corresponding signal 215. The FDRSB characteristics 210 may operate as a signature for the transmitting device, such that receiving devices may refrain from responding to or acting on any signal 215 that does not have the expected FDRSB characteristics 210.

Figure 3:
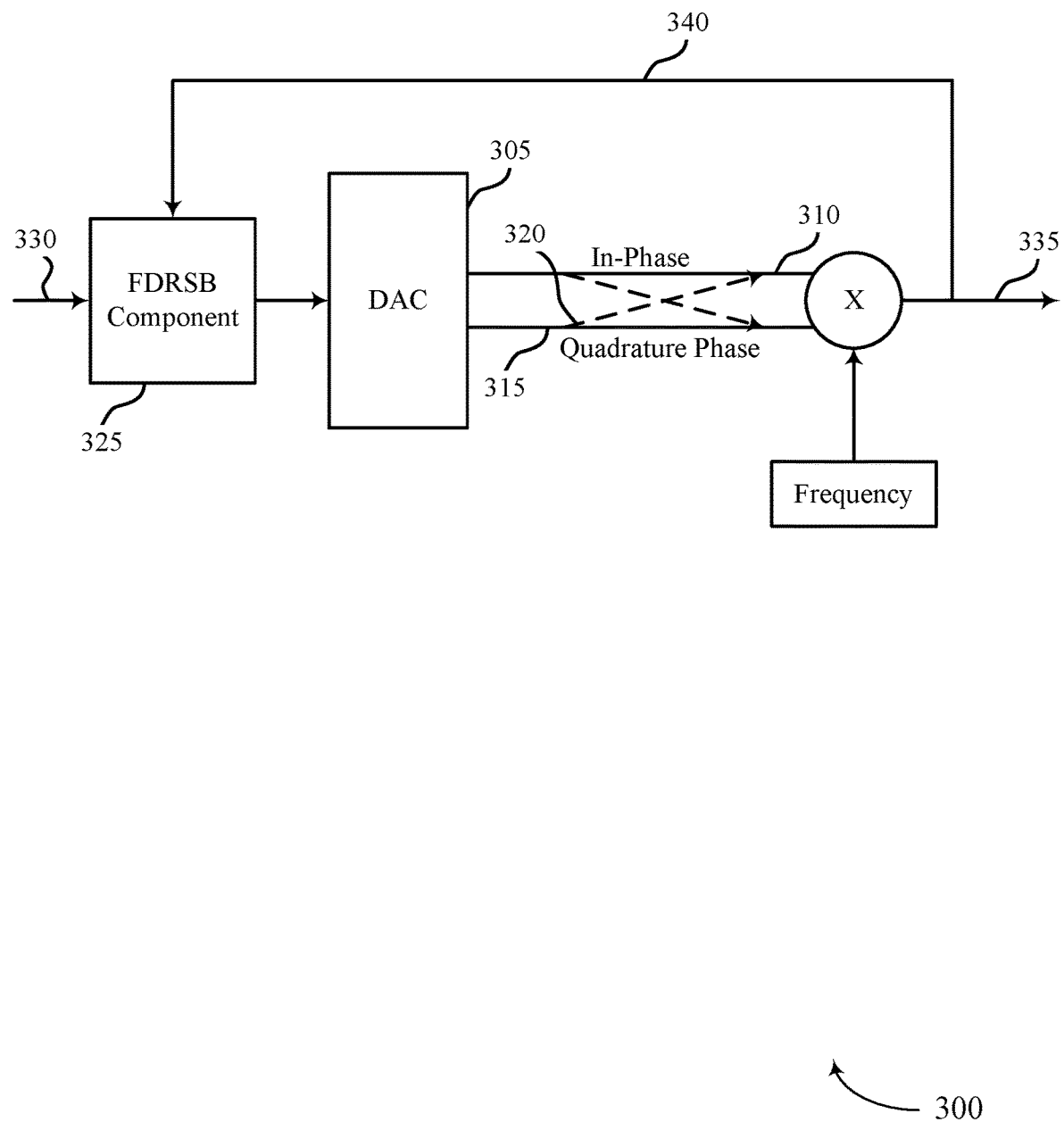
FIG. 3 illustrates an example of a transmission circuitry diagram that supports communication security based on FDRSB characteristics in accordance with one or more aspects of the present disclosure.

FIG. 3 illustrates an example of a transmission circuitry diagram 300 that supports communication security based on FDRSB characteristics in accordance with one or more aspects of the present disclosure. The transmission circuitry diagram 300 may implement or be implemented by aspects of the wireless communications systems 100 and 200 described with reference to FIGS. 1 and 2. For example, the transmission circuitry diagram 300 illustrates components of transmission circuitry at a transmitting device. The transmitting device may represent an example of a network entity 105, a UE 115, or some other network device, as described with reference to FIGS. 1 and 2. In the example of FIG. 3, the transmitting device may generate a signal 335 for transmission to a receiving device. The signal 335 may include or be scrambled with an FDRSB impairment to improve security.

The transmission circuitry at the transmitting device may include a digital-to-analog converter (DAC) 305. The DAC 305 (e.g., and/or other corresponding circuitry not illustrated in FIG. 3 for clarity) may convert an input signal 330 that includes data stored in a digital (e.g., binary) format to an analog signal and may amplify the signal for wireless transmission. The DAC 305 may produce an analog signal having an in-phase (I) component on an in-phase signal line 310 and a quadrature phase (Q) component on a quadrature phase signal line 315, which may also be referred to as a real part and an imaginary part of the signal, respectively.

The analog signal output by the DAC 305 may be multiplied by frequency to produce an output signal 335. Once multiplied by frequency, the in-phase component and the quadrature phase component may correspond to a frequency-dependent sinusoidal function, such as $Q \cos(f_c t) - I \sin(f_c t)$, where $f_c$ is a carrier frequency and t is time. In some cases, the transmitting device may be manufactured such that both of the in-phase signal line 310 and the quadrature phase signal line 315 correspond to linear channels, which may reduce complexity of decoding the signal 335.

During generation of the analog signal, cross-talk 320 may be present between the in-phase signal line 310 and the quadrature phase signal line 315. The cross-talk 320 may correspond to capacitive coupling or other parasitic capacitances between the in-phase signal line 310 and the quadrature phase signal line 315. In some cases, a material may be placed between the in-phase signal line 310 and the quadrature phase signal line 315 during manufacture of the transmitting device to reduce capacitive coupling and the cross-talk 320. However, such material may increase costs and manufacturing complexity. As such, residual side band (RSB) may be present at an output of the DAC 305 due at least in part to the cross-talk 320 between the signal lines. The RSB may be a signal self-image having a different amplitude than a desired signal 335.

In the example of FIG. 3, the RSB may be referred to as FDRSB because the frequency response of each of the in-phase component, the quadrature phase component, and the cross-talk 320 may be frequency dependent. Thus, in some cases, the signal output by the DAC 305 may include or be scrambled with FDRSB. The FDRSB may thereby correspond to a physical impairment produced during generation of a signal 335 at a transmitting device. The FDRSB may occur naturally for relatively high bandwidth inter-frequency blocks.

The FDRSB impairment may be modeled by a linear function. The function may be applied separately to each of the in-phase and quadrature phase components of a signal, as well as to the cross-talk 320 or noise between the two components. The FDRSB may be calculated using linear filters and by summarizing a mixture of the in-phase and quadrature phase components, as described in further detail elsewhere herein, including with reference to FIG. 4. The descrambling and/or correction of the FDRSB impairment may be performed at the transmitting device, at a receiving device, or both.

In some aspects, the transmitting device may include an FDRSB component 325 that may remove or reduce the FDRSB impairment before transmitting a signal 335. The FDRSB component 325 may be referred to as an FDRSB correction component, in some aspects. For example, a feedback line 340 may be present between the output of the DAC 305 and the FDRSB component 325. The FDRSB component 325 may generate, based on the feedback, a signal or impairment that is opposite to and that cancels out the FDRSB impairment associated with generation of the analog signal. That is, the FDRSB component 325 may generate an inverse model of the FDRSB based on the linear filters of the FDRSB. In some aspects (not illustrated in FIG. 3), the feedback line 340 may not be present in the transmitting device, and the FDRSB component 325 may correct or reduce the FDRSB impairment after the analog signal is multiplied by the frequency. In some cases, the transmitting device may thereby reduce or mitigate the FDRSB impairment before transmitting a signal 335.

Techniques describe herein leverage the FDRSB impairment to improve security of wireless transmissions. For example, the FDRSB impairment may be utilized to identify a transmitting device as a source of a signal 335. The FDRSB impairment may be known to the transmitting device and one or more intended receiving devices, but not to other devices, such that the FDRSB impairment may not be copied or hacked. As described in further detail with reference to FIG. 4, the FDRSB impairment may be modeled by a family of linear functions that may not introduce an energetic impairment (e.g., the FDRSB impairment may not increase power consumption), and may be recoverable by a receiving device, which may improve physical layer security while maintaining reliable communications.

To utilize FDRSB for security as described herein, the transmitting device may intentionally transmit the signal 335 with an FDRSB impairment. The FDRSB impairment may provide a physical signature or ID that identifies the transmitting device as the source of the signal 335. For example, each device may generate slightly different FDRSB characteristics due to physical differences of each device, such that the FDRSB applied during generation of the signal 335 may be unique to the transmitting device. In some aspects, the transmitting device may refrain from removing the FDRSB impairment using the FDRSB component 325. The transmitting device may instead transmit the signal 335 with the FDRSB characteristics to a receiving device, and the receiving device may determine whether the transmitting device is a source of the signal 335 based on the FDRSB impairment.

Additionally, or alternatively, the transmitting device may intentionally apply an added (e.g., artificial) FDRSB to the signal 335. For example, the FDRSB component 325 may apply additional FDRSB characteristics to the signal 335 prior to transmission. In such cases, the transmitting device may utilize the FDRSB component 325 or may not utilize the FDRSB component 325 to reduce the natural FDRSB before or after applying the artificial FDRSB. Although illustrated as a single component in FIG. 3, it is to be understood that the FDRSB component 325 may include two or more different components. For example, the FDRSB component 325 may include an FDRSB correction component that mitigates or corrects a raw FDRSB and an artificial FDRSB component that generates and applies an artificial FDRSB to the signal.

The transmitting device may additionally transmit signaling, such as an RRC or MAC-CE message, that indicates filter parameters for the receiving device to use to decode or descramble the artificial or natural FDRSB characteristics. The RRC or MAC-CE message may be secured using cryptography or other higher layer security and may be transmitted periodically or semi-statically to reduce overhead. The receiving device may decode the signal 335 and the FDRSB characteristics based on the filter parameters. The receiving device may, in some aspects, determine that the transmitting device is the source of the signal 335 based on the decoded FDRSB characteristics matching the FDRSB signature of the transmitting device. Additionally, or alternatively, the receiving device may compare a signal metric of the signal 335 after decoding the FDRSB characteristics with a signal metric of a different signal that was received without the FDRSB characteristics to determine if the transmitting device is the source, as described in further detail elsewhere herein, including with reference to FIG. 5.

In some aspects, the transmitting device may transmit a pilot signal that includes the artificial FDRSB applied to the signal 335. The receiving device may determine that the transmitting device is the source of the signal 335 based on the FDRSB characteristics of the signal 335 matching those of the pilot signal, as described in further detail elsewhere herein, including with reference to FIG. 6.

The transmitting device may thereby utilize the transmission circuitry to apply a natural or artificial FDRSB impairment to a signal before transmission. The FDRSB impairment may be used to identify the source the transmission, which may provide for secure and reliable wireless communications.

Figure 4:
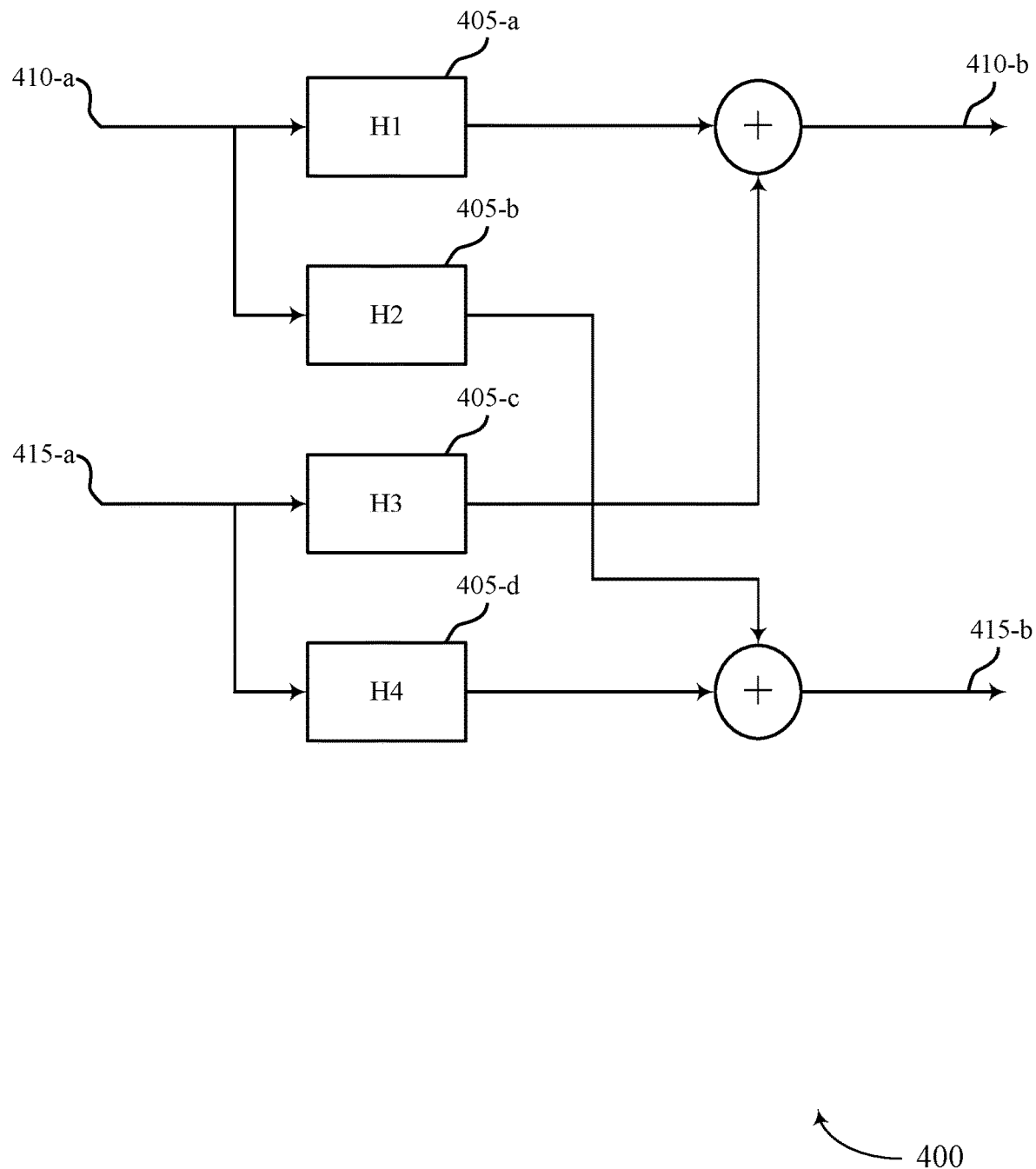
FIG. 4 illustrates an example of a filter diagram that supports communication security based on FDRSB characteristics in accordance with one or more aspects of the present disclosure.

FIG. 4 illustrates an example of a filter diagram 400 that supports communication security based on FDRSB characteristics in accordance with one or more aspects of the present disclosure. The filter diagram 400 may implement or be implemented by aspects of the wireless communications systems 100 and 200, as well as the transmission circuitry diagram 300 described with reference to FIGS. 1-3. For example, the filter diagram 400 illustrates example linear filters 405 that may be used to model an FDRSB impairment of a signal. The signal input to the filters 405 may include an in-phase component 410-$a$ and a quadrature phase component 415-$a$, which may represent examples of corresponding components described with reference to FIG. 3. The filters 405 may be used by a receiving device, a transmitting device, or both to decode and descramble FDRSB characteristics of a signal. The transmitting and receiving devices may each represent examples of a UE, a base station, a network entity, or some other wireless device, as described with reference to FIGS. 1-3.

The in-phase component 410-$a$ and the quadrature phase component 415-$a$ of the signal may be input to and filtered by one or more respective filters 405 (e.g., filters $H_1$ through $H_4$). Each filter 405 may be a linear time-invariant (LTI) filter, which may preserve a frequency of the signal. The outputs of the filters 405 may be summarized to generate an output signal including an in-phase component 410-$b$ and a quadrature phase component 415-$b$. At a transmitting device, the input signal may not include FDRSB characteristics, and the output signal may include the FDRSB characteristics. At a receiving device, the filters 405 may be inverse filters that remove or descramble the FDRSB characteristics from the input signal.

The filters 405 may represent the FDRSB impairment applied to the in-phase component 410-$a$, the quadrature phase component 415-$a$, and the cross-talk (e.g., parasitic capacitance) between the components, as described with reference to FIG. 3. For example, a transmitting device may pass the in-phase component 410-$a$ through the filter 405-$a$ (e.g., H1). The cross-talk between an in-phase signal line and a quadrature phase signal line may pass through the filter 405-$c$ (e.g., H3) and be summed with the filtered in-phase component 410-$a$. The sum of the outputs of the filters 405-$a$ and 405-$c$ may represent an output in-phase component 410-$b$ having FDRSB characteristics. The quadrature phase component 415-$a$ may pass through the filter 405-$d$ (e.g., H4). The cross-talk (e.g., parasitic capacitance) between the quadrature phase signal line and the in-phase signal line may pass through the filter 405-$b$ (e.g., H2) and be summed with the filtered quadrature phase component 415-$a$. The sum of the outputs of the filters 405-$b$ and 405-$d$ at a transmitting device may represent an output quadrature phase component 415-$b$ having FDRSB characteristics.

The transmitting device may transmit one or more FDRSB parameters to a receiving device for the receiving device to use to decode the FDRSB characteristics. The FDRSB parameters may, in some aspects, include filter parameters for the filters 405-$a$, 405-$b$, 405-$c$, and 405-$d$. The receiving device may utilize the indicated filter parameters to generate an inverse of the filters 405, for example, filters $H_5$, $H_6$, $H_7$, and $H_8$ (not pictured in FIG. 4) that may cancel, reverse, or descramble the FDRSB applied by the filters 405-$a$ through 405-$d$. At the receiving device, the input signal including the in-phase component 410-$a$ and the quadrature phase component 415-$b$ may include one or more FDRSB characteristics. After passing the input signal through the inverse filters 405, the output signal generated by the receiving device may include the in-phase component 410-$b$ and the quadrature phase component 415-$b$ without FDRSB characteristics. That is, the receiving device may use the inverse filters 405 to decode and descramble the data within a signal from the applied FDRSB characteristics. The signal including the in-phase component 410-$b$ and the quadrature phase component 415-$b$ may be transmitted over a linear over-the-air (OTA) channel. In some aspects, when applying the inverse of the filters 405 for a linear channel, some noise associated with the channel may be amplified. In such cases, decoding the FDRSB may increase noise (e.g., noise enhancement).

As described herein, the transmitting device may model the artificial FDRSB using one or more all-pass filters (APFs). The family of APFs may correspond to relatively constant power across a frequency domain. That is, as frequency changes, the power may remain the same, but a phase of the function may vary. As such, energy may be preserved and noise may not be enhanced by the APF. Thus, to provide improve security by using an FDRSB impairment as a security key while maintaining performance, a transmitting device as described herein may apply an artificial FDRSB modeled by the filter 405-*a* and the filter 405-*d*, which may be APFs. An infinite impulse response (IIR) equation may represent the APFs, as described in Equation 1.

$$H(e^{jw}) = \prod_k \frac{z^{-1} - \gamma_k^*}{1 - \gamma_k z^{-1}} \quad (1)$$

In the example of Equation 1, $|\gamma_k|<1$. Additionally, the values of $\gamma_k$ may be any complex values that are stable. The value of k may represent an APF order and may be any number. A phase of a filter response of the APF (e.g., a range of an angular response) may be based on the APF order. The described impairment may be added by the transmitting device as part of a DFE of the transmitting device using transmission circuitry, as described with reference to FIG. 3.

The transmitting device may transmit signaling that indicates filter parameters for the filters 405. The filter parameters may indicate values of the $\gamma_k$ parameters for each filter 405. In some aspects, the FDRSB impairment may be added such that the filters 405-*a* and 405-*d* are modeled by APFs, and the filters 405-*b* and 405-*c* may not be used (e.g., $H_2=H_3=0$ or the $\gamma_k \in Re$ for the filters $H_2$ and $H_3$). The receiving device may apply the filter parameters for the filter 405-*a* on the in-phase component 410 and the filter parameters for the filter 405-*d* on the quadrature phase component 415 of the received signal to descramble the FDRSB characteristics of the signal without increasing noise.

The receiving device may thus remove the FDRSB and decode the signal accurately if the receiving device knows the filter parameters. However, other (e.g., intruder) devices that do not know the filter parameters may not decode the signal accurately. In some aspects, an intruder device may utilize a brute force method, or some other method to predict or hack the inverse filters. To reduce a probability that an intruder is able to hack the APF, the transmitting device may utilize greater APF orders. Greater APF orders may improve performance and may be associated with greater decoding complexity as compared with lower APF orders. The complexity of an IIR filter may increase linearly in relation to the value of the APF order. Thus, an SNR of a signal scrambled with FDRSB using a relatively high APF order (e.g., k=22) that is decoded by an intruder device may be relatively low compared to an SNR of a signal scrambled with FDRSB using a relatively low APF order (e.g., k=1), such that it may be more difficult for an intruder to hack APF filters having higher APF orders.

Thus, an artificial or natural FDRSB impairment may be applied to a signal before transmission to secure the signal. The FDRSB may be modeled by one or more linear filters 405. By receiving an indication of filter parameters for the filters 405, a receiving device may decode a received signal, descramble the FDRSB from the data or other information in the received signal, and determine a source of the received signal based on the FDRSB characteristics. Intruding devices may be unable to decode the signal accurately without knowing the filter parameters. The filter parameters may correspond to APF filters, or some other types of filters that may reduce noise enhancement and maintain performance of the received signal.

In some aspects, the receiving device may compare a signal metric of the signal after descrambling the FDRSB characteristics with a signal metric of one or more other signals received from an expected transmitting device without FDRSB, as described with reference to FIG. 5. Additionally, or alternatively, the receiving device may compare the descrambled FDRSB characteristics with an expected FDRSB signature or with FDRSB characteristics of another pilot signal transmitting by an expected transmitting device, as described with reference to FIG. 6.

Figure 5:
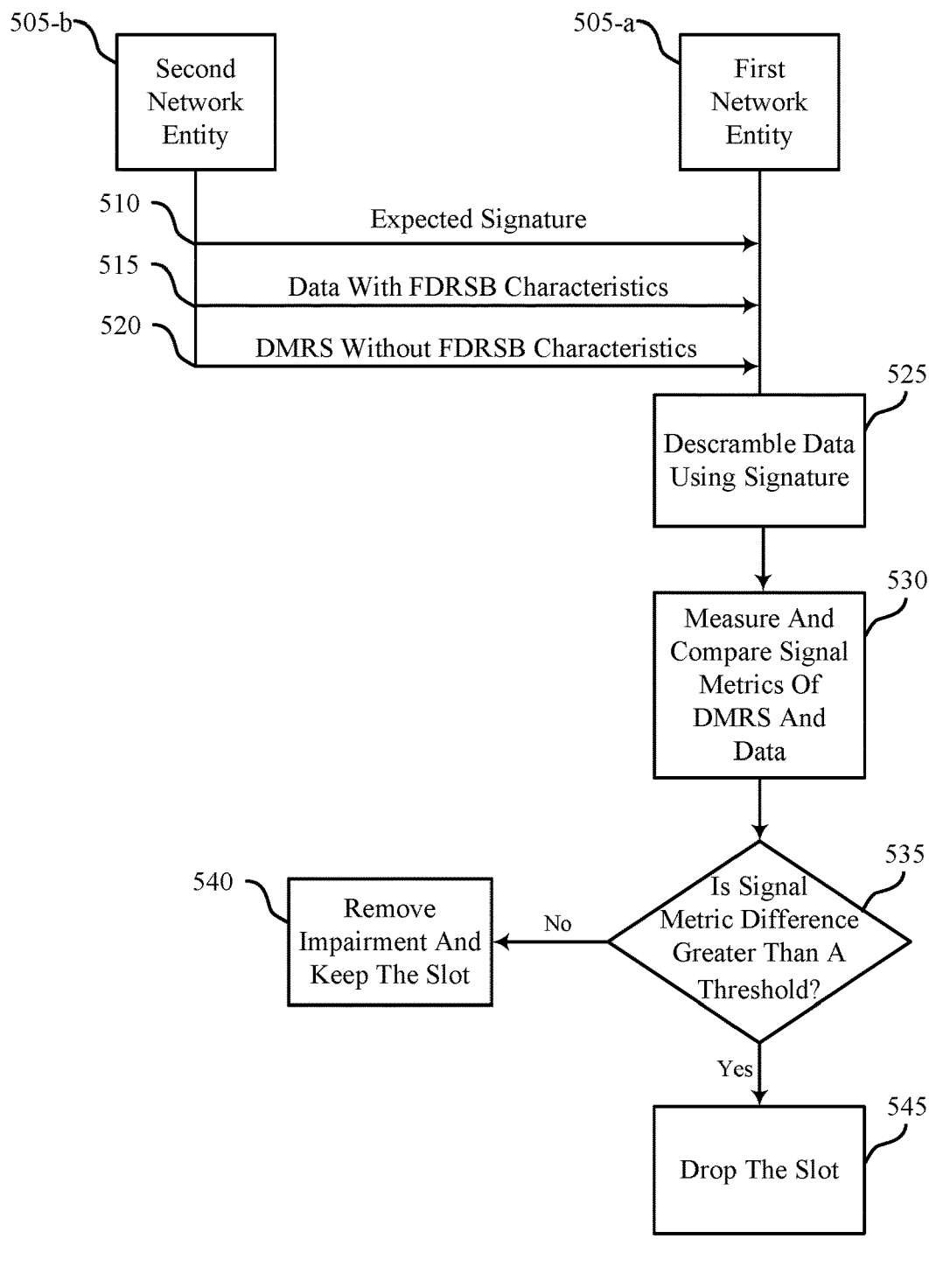
FIG. 5 illustrates an example of a flow diagram that supports communication security based on FDRSB characteristics in accordance with one or more aspects of the present disclosure.

FIG. 5 illustrates an example of a flow diagram 500 that supports communication security based on FDRSB characteristics in accordance with one or more aspects of the present disclosure. The flow diagram 500 may implement or be implemented by aspects of the wireless communications systems 100 and 200, the transmission circuitry diagram 300, and the filter diagram 400, as described with reference to FIGS. 1-4. For example, the flow diagram 500 may illustrate a method for determining, by a first network entity 505-*a*, whether a source of a received signal is a second network entity 505-*b* or an intruder entity. The first network entity 505-*a* and the second network entity 505-*b* may each represent examples of a UE, a base station, a CU, a DU, an RU, an IAB node, or any other network node or device as described with reference to FIGS. 1-4.

In the following description of the flow diagram 500, the operations between the first network entity 505-*a* and the second network entity 505-*b* may be performed in different orders or at different times. Some operations may also be left out of the flow diagram 500, or other operations may be added. Although the first network entity 505-*a* and the second network entity 505-*b* are shown performing the operations of the flow diagram 500, some aspects of some operations may also be performed by one or more other wireless devices.

At 510, the second network entity 505-*b* may transmit an expected signature to the first network entity 505-*a*. For example, the second network entity 505-*b* may transmit a control message (e.g., first signaling), such as an RRC message, a MAC-CE, or some other control message (e.g., a Layer 2 or Layer 3 message), that indicates one or more FDRSB parameters associated with the second network entity 505-*b*. The FDRSB parameters may include filter parameters for a set of linear filters that model FDRSB applied by the second network entity 505-*b* to a signal (e.g., values of $|(\gamma_k)_{k=1}^K|$ for each of a set of filters $\{H_r\}_{r=1}^4$), as described with reference to FIG. 4.

The second network entity 505-*b* may transmit the RRC or MAC-CE message periodically, aperiodically, or semi-persistently (e.g., semi-persistent scheduling (SPS)) to indicate the expected signature. In some aspects, the second network entity 505-*b* may refrain from removing a raw FDRSB impairment that occurs during generation of a signal. The filter parameters for modeling the raw FDRSB impairment may not change over time, and the second network entity 505-*b* may transmit a signal control message that indicates the filter parameters. Additionally, or alternatively, the second network entity 505-*b* may intentionally apply an artificial FDRSB impairment. In such cases, the second network entity 505-*b* may change the artificial FDRSB impairment dynamically to improve security and reduce a probability that an intruder device can predict or hack the FDRSB impairment. The second network entity 505-*b* may dynamically transmit the control message indicating the expected signature accordingly, such that the first network entity 505-*a* may be aware of a current set of filter parameters for receiving a signal from the second network entity 505-*b* at a given time. The control message may be encrypted using cryptography or some other encryption technique, such that other devices or nodes may not hack the control signaling to identify the expected signature.

At 515, the second network entity 505-*b* may transmit data to the first network entity 505-*a* (e.g., second signaling). The data may be transmitted via a PDCCH, a PDSCH, a PUSCH, a PUCCH, a physical sidelink control channel (PSCCH), a physical sidelink shared channel (PSSCH), or any combination thereof. The data may be scrambled with or may include one or more FDRSB characteristics. For example, the second network entity 505-*b* may refrain from removing or mitigating the FDRSB during generation of the signal including the data, as described with reference to FIG. 3. Additionally, or alternatively, the second network entity 505-*b* may intentionally apply an artificial FDRSB to the signal including the data prior to transmission.

At 520, the second network entity 505-*b* may transmit a DMRS to the first network entity 505-*a* (e.g., third signaling). The DMRS may be transmitted without FDRSB characteristics. For example, the second network entity 505-*b* may utilize an FDRSB correction component or some other component to mitigate or reduce the FDRSB before transmitting the DMRS, as described with reference to FIG. 3. In some aspects, the DMRS may include a relatively small amount of FDRSB or an FDRSB impairment that occurs naturally at the second network entity 505-*b*, but the second network entity 505-*b* may not add any artificial FDRSB.

Although the DMRS is illustrated as being transmitted without FDRSB characteristics and the data is illustrated as being transmitted with FDRSB characteristics in FIG. 5, it is to be understood that the second network entity 505-*b* may transmit any type of traffic, signaling, or resources to the first network entity 505-*a* with or without FDRSB. The second network entity 505-*b* may apply the FDRSB characteristics (e.g., raw or artificial characteristics) to a signal to provide an additional layer of security for the corresponding signal. In some aspects, the second network entity 505-*b* may transmit the DMRS (e.g., a pilot signal) with artificial FDRSB and the second network entity 505-*b* may remove the FDRSB from the data prior to transmission. For example, the pilot signal may include a WUS, and the second network entity 505-*b* may protect the WUS with additional security. Additionally, or alternatively, the second network entity 505-*b* may transmit the data, the DMRS, and the expected signature in any order. In some aspects, the expected signature may be transmitted after the DMRS and the data, or in any other order. The traffic may include Layer 1 traffic (e.g., physical layer traffic), or any other layer of traffic that may be encrypted or may not be encrypted using one or more other additional security techniques.

At 525, the first network entity 505-*a* may descramble the data using the expected signature. For example, the expected signature may indicate filter parameters, and the first network entity 505-*a* may use the filter parameters to generate inverse filters to use for decoding and reducing the data from the FDRSB characteristics, as described with reference to FIG. 4. The first network entity 505-*a* my descramble the data before the first network entity 505-*a* knows whether the second network entity 505-*b* is the source of the data. As such, in some cases, the first network entity 505-*a* may descramble any received data or other signaling using the expected signature, regardless of whether the signaling is transmitted by the second network entity 505-*b*.

At 530, the first network entity 505-*a* may measure or estimate a signal metric of the data and the DMRS. The signal metric may be SNR, reference signal received power (RSRP), signal-to-interference-plus-noise ratio (SINR), or some other metric. The first network entity 505-*a* may compare the measured signal metric of the DMRS with the measured signal metric of the data after descrambling the FDRSB characteristics. The first network entity 505-*a* may determine or calculate a value indicative of a difference between a first measured signal metric of the DMRS and a second measured signal metric of the data. The signal metric used for comparison may be configured by a vendor of the first network entity 505-*a*, a vendor of the second network entity 505-*b*, or both (e.g., the vendors may be the same). Additionally, or alternatively, the first network entity 505-*a* may dynamically determine which signal metric to use (e.g., based on a standard, a condition, or a defined rule) or the first network entity 505-*a* may receive signaling that indicates which signal metric to use.

In some aspects, the FDRSB characteristics applied to the data may not affect a signal metric of the data. For example, as described with reference to FIG. 4, if the FDRSB characteristics are modeled by APFs, or some other linear or non-linear filters, the first network entity 505-*a* may receive and descramble the FDRSB from the data without enhancing performance of the received data (e.g., signal metric levels may be maintained). As such, the first network entity 505-*a* may expect a signal metric of the data after descrambling and removing the FDRSB to be the same as or similar to a signal metric of the DMRS or some other signaling that was received without FDRSB.

At 535, the first network entity 505-*a* may determine whether the value of the difference between the first and second signal metrics is greater than a threshold value. The threshold value may be signaled to the first network entity 505-*a* via control signaling, such as an RRC message, a MAC-CE, or some other control signaling. Additionally, or alternatively, the first network entity 505-*a* may be configured with the threshold value.

At 540, if the signal metric difference is the same as or less than the threshold difference, the first network entity 505-*a* may determine that the second network entity 505-*b* is the source of the data. The first network entity 505-*a* may thus remove the FDRSB impairment and keep the slot in which the data was transmitted. The first network entity 505-*a* may communicate with the second network entity 505-*b* based on the received data. For example, if the data includes information for the first network entity 505-*a*, the first network entity 505-*a* may transmit an acknowledgment or otherwise respond to the information based on determining that the second network entity 505-*b* is the source of the data.

At 545, if the signal metric difference is greater than the threshold difference, the first network entity 505-*a* may determine that the second network entity 505-*b* may not be the source of the data, and the first network entity 505-*a* may drop the slot accordingly. That is, the first network entity 505-*a* may ignore the data, delete the data from memory, refrain from responding to the data, or any combination thereof. As described with reference to FIG. 4, the first network entity 505-*a* may be able to descramble the data from the FDRSB without performance loss if the first network entity 505-*a* knows the FDRSB filter parameters. As such, the signal metric difference being greater than the threshold difference may be indicative of the data being transmitted by an intruder entity or device. For example, the SNR of the data may be relatively low, which may indicate that the data is from an intruder entity and was not scrambled with the same FDRSB characteristics as the FDRSB characteristics indicated by the second network entity 505-b.

In some aspects, if the signal metric difference is greater than the threshold difference at 545, the first network entity 505-a may declare an attack attempt and transmit feedback to the second network entity 505-b to indicate the attack attempt. For example, the first network entity 505-a may transmit a message to the second network entity 505-b to indicate a value of the difference between the first signal metric and the second signal metric (e.g., an SNR delta). In some aspects, the second network entity 505-b may receive feedback from the first network entity 505-a, one or more other network entities 505, or both, and the second network entity 505-b may make a determination regarding network security based on the feedback.

The first network entity 505-a may thus determine whether a signal is transmitted by an expected network entity or an intruder device based on an applied FDRSB impairment. An intruder device may not know the expected signature and corresponding filter parameters used by the second network entity 505-b. For example, the expected signature may be transmitted via higher layer signaling that may be encrypted. As such, an intruder device may transmit an intruder signal having different FDRSB characteristics than a signal transmitted by the second network entity 505-b. If the first network entity 505-a decodes the intruder signal and descrambles the FDRSB using the filter parameters indicated by the second network entity 505-b, a measured signal metric of the decoded signal may be relatively high or low (e.g., due to errors in the decoding). Thus, the signal metric difference will likely be greater than the threshold, and the first network entity 505-a may refrain from responding to the intruder signal.

A receiving network entity 505 as described herein may thus compare a signal metric of a first signal received with FDRSB to a signal metric of a second signal received without FDRSB to determine whether the FDRSB applied to the first signal matches an expected FDRSB signature of an expected source transmitter. By utilizing FDRSB as a security for lower layer signaling, the described techniques may provide for improved security of wireless communications while maintaining throughput and signal metric performance.

Figure 6:
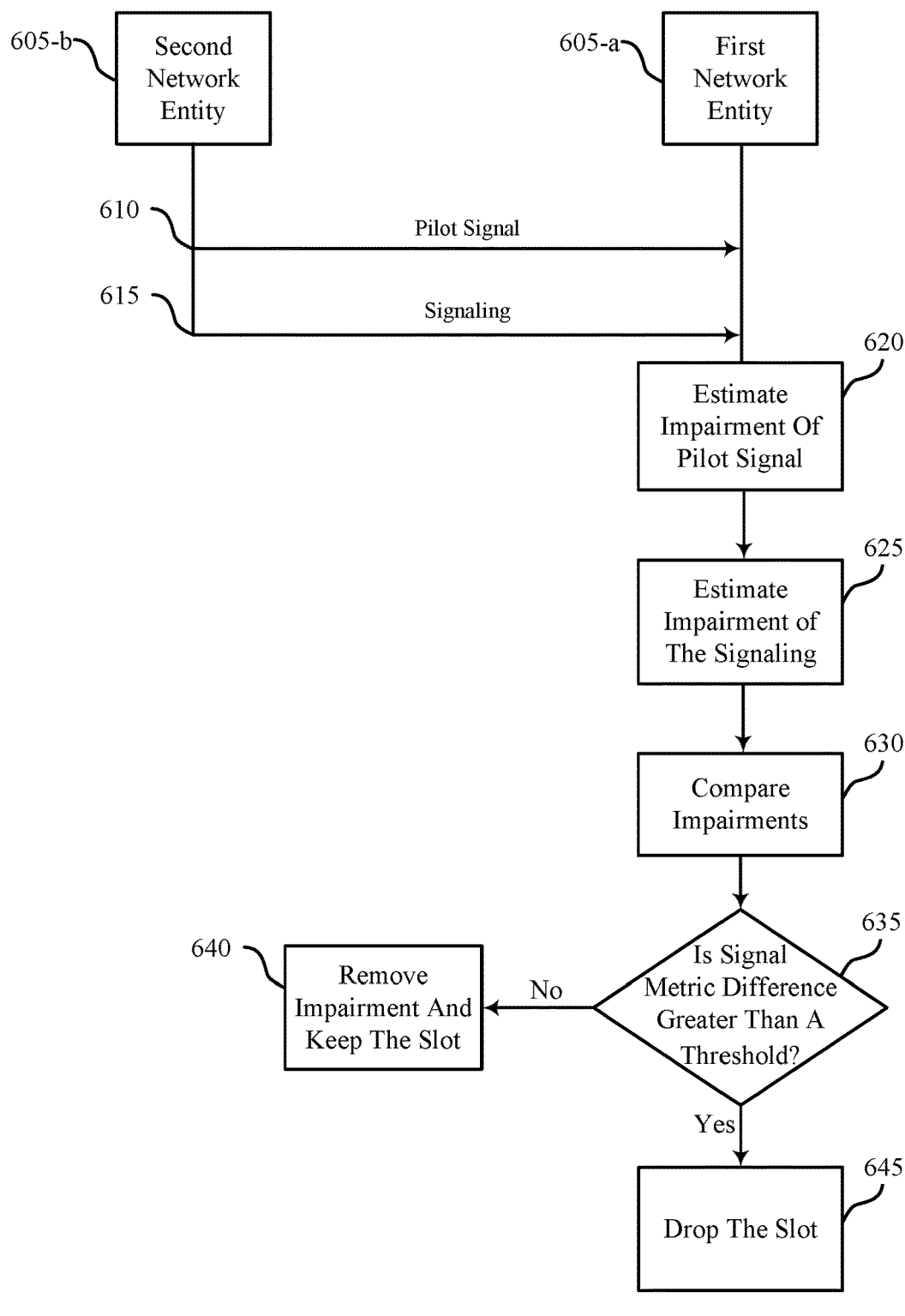
FIG. 6 illustrates an example of a flow diagram that supports communication security based on FDRSB characteristics in accordance with one or more aspects of the present disclosure.

FIG. 6 illustrates an example of a flow diagram 600 that supports communication security based on FDRSB characteristics in accordance with one or more aspects of the present disclosure. The flow diagram 600 may implement or be implemented by aspects of the wireless communications systems 100 and 200, the transmission circuitry diagram 300, and the filter diagram 400, as described with reference to FIGS. 1-4. For example, the flow diagram 600 may illustrate a method for determining, by a first network entity 605-a, whether a source of a received signal is a second network entity 605-b or an intruder entity. The first network entity 605-a and the second network entity 605-b may each represent examples of a UE, a base station, a CU, a DU, an RU, an IAB node, or any other network node or device as described with reference to FIGS. 1-5.

In the following description of the flow diagram 600, the operations between the first network entity 605-a and the second network entity 605-b may be performed in different orders or at different times. Some operations may also be left out of the flow diagram 600, or other operations may be added. Although the first network entity 605-a and the second network entity 605-b are shown performing the operations of the flow diagram 600, some aspects of some operations may also be performed by one or more other wireless devices.

At 610, the second network entity 605-b may transmit a pilot signal to the first network entity 605-a and one or more other network entities 605 via a unicast or broadcast message (e.g., first signaling). The pilot signal may be a reference signal, such as a SERS, a DMRS, or some other signaling. The pilot signal may be scrambled with or may include one or more FDRSB characteristics, which may be raw or artificial FDRSB characteristics applied by the second network entity 605-b.

In some aspects, the second network entity 605-b may transmit multiple pilot signals including the pilot signal periodically or aperiodically to the first network entity 605-a (e.g., and/or one or other network entities 605). Each pilot signal may be transmitted with respective FDRSB characteristics applied by the second network entity 605-b. For example, other pilot signals may have different FDRSB characteristics than the one or more FDRSB characteristics of the pilot signal transmitted at 615. In such cases, the second network entity 605-b may transmit control signaling that indicates an index of the pilot signal from the multiple pilot signals (e.g., the fifth pilot signal, or every other pilot signal, or some other index or indication). The control signaling may be an encrypted RRC message, a MAC-CE, or some other message (e.g., Layer 2 or Layer 3 message). The first network entity 605-a may identify and decode the pilot signal based on the index.

At 615, the second network entity 605-b may transmit signaling to the first network entity 605-a (e.g., second signaling). The signaling may include data, control information, a DMRS, or any other information that may be secured by the second network entity 605-b. The signaling may be scrambled with one or more FDRSB characteristics that may be the same as or similar to the FDRSB characteristics of the pilot signal. The second network entity 605-b may intentionally apply the one or more FDRSB characteristics (e.g., artificial FDRSB) or the one or more FDRSB characteristics may be raw or natural FDRSB and the second network entity 605-b may refrain from removing the FDRSB, as described with reference to FIG. 3. It is to be understood that the second network entity 605-b may transmit the signaling and the one or more pilot signals in any order. In some aspects, the signaling may be transmitted before one or more of the pilot signals, or in any other order.

At 620, the first network entity 605-a may estimate an FDRSB impairment of the pilot signal. For example, the first network entity 605-a may estimate one or more filter parameters for descrambling the FDRSB impairment. Additionally, or alternatively, the second network entity 605-b may transmit control signaling to the first network entity 605-a to indicate the filter parameters, and the first network entity 605-a may descramble the FDRSB based on the indicated filter parameters, as described with reference to FIG. 5.

In some aspects, the first network entity 605-a may decode the pilot signal with or without knowing the FDRSB filter parameters, and the first network entity 605-a may estimate a signal metric of the decoded pilot signal (e.g., an SNR, an RSRP, or some other signal metric). The first network entity 605-a may store the estimated or determined FDRSB characteristics (e.g., filter parameters or signal metric) of the pilot signal in a memory of the first network entity 605-a based on the index of the pilot signal.

At 625, the first network entity 605-a may estimate impairment of the signaling. For example, the first network entity 605-a may estimate one or more filter parameters for descrambling an FDRSB impairment applied to the signaling. Additionally, or alternatively, the second network entity 605-*b* may transmit control signaling to the first network entity 605-*a* to indicate the filter parameters, and the first network entity 605-*a* may descramble the FDRSB from the signaling based on the indicated filter parameters, as described with reference to FIG. 5. In some aspects, the first network entity 605-*a* may decode the signaling with or without knowing the FDRSB filter parameters, and the first network entity 605-*a* may estimate a signal metric of the decoded signaling (e.g., an SNR, an RSRP, or some other signal metric).

At 630, the first network entity 605-*a* may compare the estimated impairment of the pilot signal with the estimated impairment of the signaling. For example, the first network entity 605-*a* may compare the estimated FDRSB characteristics of the pilot signal with the estimated FDRSB characteristics of the signaling. Additionally, or alternatively, the first network entity 605-*b* may compare a measured signal metric of the pilot signal with a measured signal metric of the signaling. The first network entity 605-*a* may determine an impairment difference between the impairments based on the comparing.

At 635, the first network entity 605-*a* may determine whether the impairment difference is greater than a threshold difference. The threshold difference may be signaled to the first network entity 605-*a* via control signaling, such as an RRC message, a MAC-CE, or some other control signaling. Additionally, or alternatively, the first network entity 605-*a* may be configured with the threshold value.

At 640, if the impairment difference is the same as or less than the threshold difference, the first network entity 605-*a* may determine that the second network entity 605-*b* is the source of the signaling. The first network entity 605-*a* may thus remove the FDRSB impairment and keep the slot in which the signaling was transmitted. The first network entity 605-*a* may communicate with the second network entity 605-*b* based on the received signaling. For example, if the signaling includes a WUS, the first network entity 605-*a* may wake up and enter a DRX on stage accordingly based on determining that the second network entity 605-*a* is the source of the WUS.

At 645, if the impairment difference is greater than the threshold difference, the first network entity 605-*a* may determine that the second network entity 605-*b* may not be the source of the signaling, and the first network entity 605-*a* may drop the slot accordingly. That is, the first network entity 605-*a* may ignore the signaling, delete the signaling from memory, refrain from responding to the signaling, or any combination thereof. The impairment difference being greater than the threshold difference may be indicative of the data being transmitted by an intruder entity or device.

In some aspects, at 645, the first network entity 605-*a* may declare an attack attempt and transmit feedback to the second network entity 605-*b* to indicate the attack attempt. For example, the first network entity 605-*a* may transmit a message to the second network entity 605-*b* to indicate a value of the impairment difference (e.g., an SNR delta). In some aspects, the second network entity 605-*b* may receive feedback from the first network entity 605-*a*, one or more other network entities 605, or both, and the second network entity 605-*b* may make a determination regarding network security based on the feedback.

The first network entity 605-*a* may thus determine whether a signal is transmitted by an expected network entity or an intruder device based on an applied FDRSB impairment and a received pilot signal. An intruder device may receive pilot signals, but may not know which pilot signal includes or is scrambled with an expected FDRSB. As such, the intruder device may not transmit signaling having the expected FDRSB characteristics. Thus, if the first network entity 605-*a* receives signaling with an impairment that matches an impairment of the indicated pilot signal, the first network entity 605-*a* may determine that the second network entity 605-*b* is the proper source of the signaling. The described techniques may thereby provide for improved security of wireless communications using an FDRSB impairment while maintaining throughput and signal metric performance.

Figure 7:
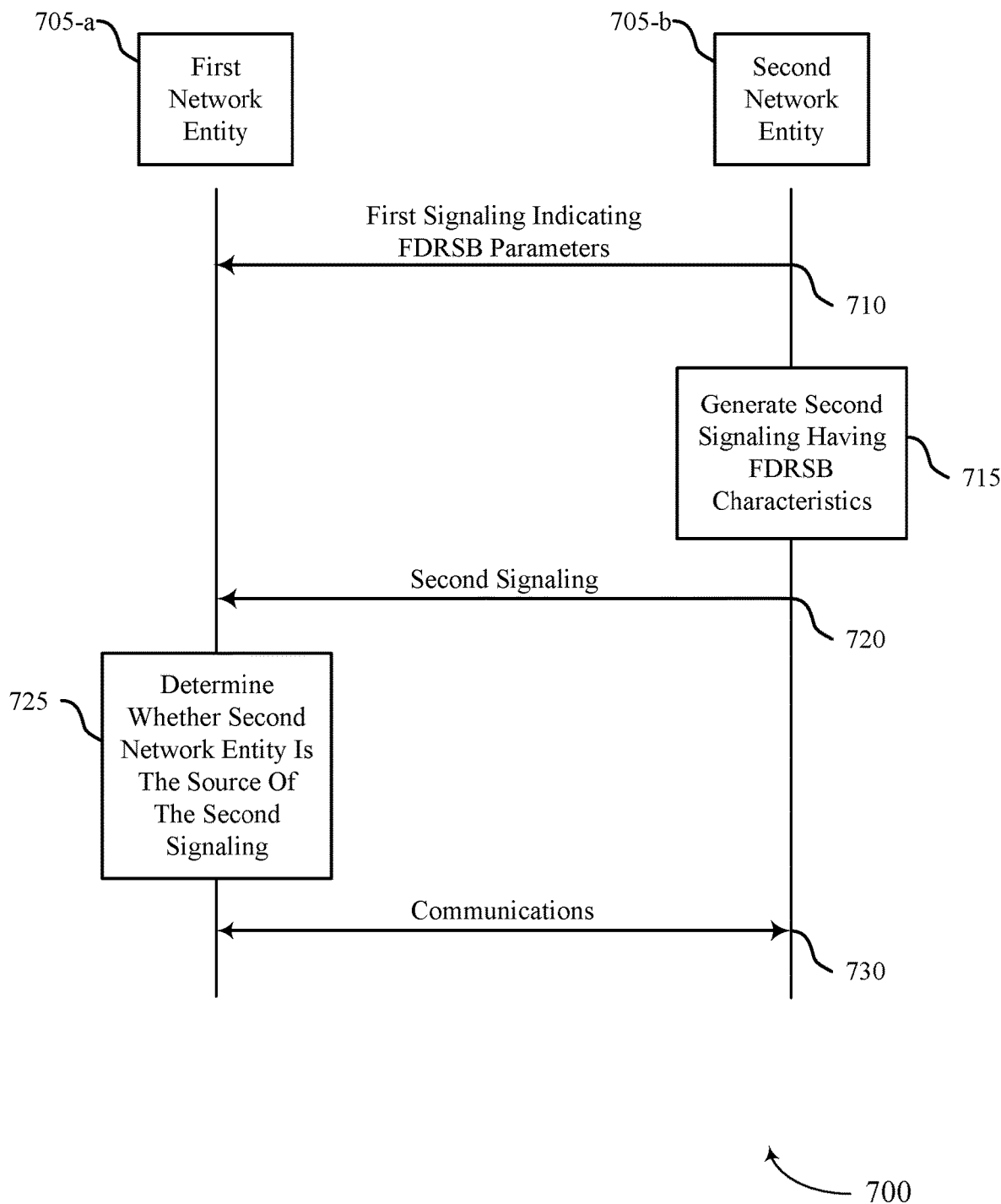
FIG. 7 illustrates an example of a process flow that supports communication security based on FDRSB characteristics in accordance with one or more aspects of the present disclosure.

FIG. 7 illustrates an example of a process flow 700 that supports communication security based on FDRSB characteristics in accordance with one or more aspects of the present disclosure. The process flow 700 may implement or be implemented by aspects of the wireless communications systems 100 and 200 as described with reference to FIGS. 1 and 2. For example, the process flow 700 illustrates communications between a first network entity 705-*a* and a second network entity 705-*b*, which may represent examples of UEs, base stations, CUs, DUs, RUs, IAB nodes, or any combination thereof as described with reference to FIGS. 1-6. In some aspects, the first network entity 705-*a* and the second network entity 705-*b* may exchange secure communications using an applied FDRSB impairment as described herein.

In the following description of the process flow 700, the operations between the first network entity 705-*a* and the second network entity 705-*b* may be performed in different orders or at different times. Some operations may also be left out of the process flow 700, or other operations may be added. Although the first network entity 705-*a* and the second network entity 705-*b* are shown performing the operations of the process flow 700, some aspects of some operations may also be performed by one or more other wireless devices.

At 710, the second network entity 705-*b* may transmit first signaling indicating one or more FDRSB parameters associated with the second network entity 705-*b* to the first network entity 705-*a*. The one or more FDRSB parameters may be associated with an imbalance between an in-phase component (e.g., a real part) and a quadrature phase component (e.g., an imaginary part) of the first signaling. In some aspects, the first signaling may represent an example of control signaling, such as an RRC or MAC-CE message, that indicates the one or more FDRSB parameters (e.g., an expected signature). The one or more FDRSB parameters may include a set of filter parameters for the first network entity 705-*a* to use to decode an expected FDRSB that may be applied by the second network entity 705-*b*. The first signaling may be transmitted periodically or aperiodically to dynamically indicate the expected FDRSB, which may change over time to improve security.

In some other aspects, the first signaling may represent an example of a pilot signal, such as a SERS, that may be scrambled with one or more FDRSB characteristics. In such cases, the FDRSB parameters may include the one or more FDRSB characteristics of the pilot signal, as described with reference to FIG. 6.

At 715, the second network entity 705-*b* may generate second signaling that is configured to have one or more FDRSB characteristics. Generating the second signaling may include amplifying a signal, converting a digital signal to an analog signal or both, using transmission circuitry as described with reference to FIG. 3. The generation of the second signaling may naturally scramble the second signaling with the one or more FDRSB characteristics, and the second network entity 705-b may refrain from removing the raw FDRSB from the second signaling before transmission. Additionally, or alternatively, the one or more FDRSB characteristics may correspond to an additional or artificial FDRSB applied by an FDRSB component of the second network entity 705-b during generation of the second signaling, as described with reference to FIG. 3.

At 720, the second network entity 705-b may transmit the second signaling to the first network entity 705-a. The second signaling may be transmitted with the one or more FDRSB characteristics. For example, the data or other information included in the second signaling may be scrambled with the one or more FDRSB characteristics.

At 725, the first network entity 705-a may determine whether the second network entity 705-b is the source of the second signaling based on the one or more FDRSB characteristics of the second signaling and the one or more FDRSB parameters indicated by the first signaling. In some aspects, the first network entity 705-a may determine whether the second network entity 705-b is the source of the second signaling based on comparing one or more characteristics of the decoded second signaling (e.g., FDRSB characteristics, signal metrics, or the like) with one or more characteristics of signaling previously received from the second network entity 705-b. For example, the first network entity 705-a may determine if the second signaling is transmitted with an expected signature of the second network entity 705-b. In some aspects, if the first signaling comprises a pilot signal that is scrambled with one or more expected FDRSB characteristics, the first network entity 705-a may compare the FDRSB characteristics indicated by the pilot signal with the FDRSB characteristics of the second signaling to determine whether the second network entity 705-b is the source of the second signaling, as described with reference to FIG. 6.

In some other aspects, the first signaling may indicate filter parameters for descrambling the FDRSB characteristics from the second signaling. In such cases, the second network entity 705-b may transmit third signaling to the first network entity 705-a without FDRSB characteristics (e.g., a DMRS, data, a reference signal, or some other signaling). The first network entity 705-a may compare a measured signal metric of the second signaling with a measured signal metric of the third signaling to determine whether the second network entity 705-b is the source of the second signaling, as described with reference to FIG. 5.

At 730, the first network entity 705-a may communicate with the second network entity 705-b based on determining that the second network entity 705-b is the source of the second signaling. For example, if the second signaling includes a WUS, the first network entity 705-a may wake up and enter a DRX on mode. Additionally, or alternatively, the first network entity 705-a may decode and respond to information in the second signaling. The first network entity 705-a and the second network entity 705-b may thus secure lower layer communications using an FDRSB impairment to improve communication reliability and reduce complexity.

Figure 8:
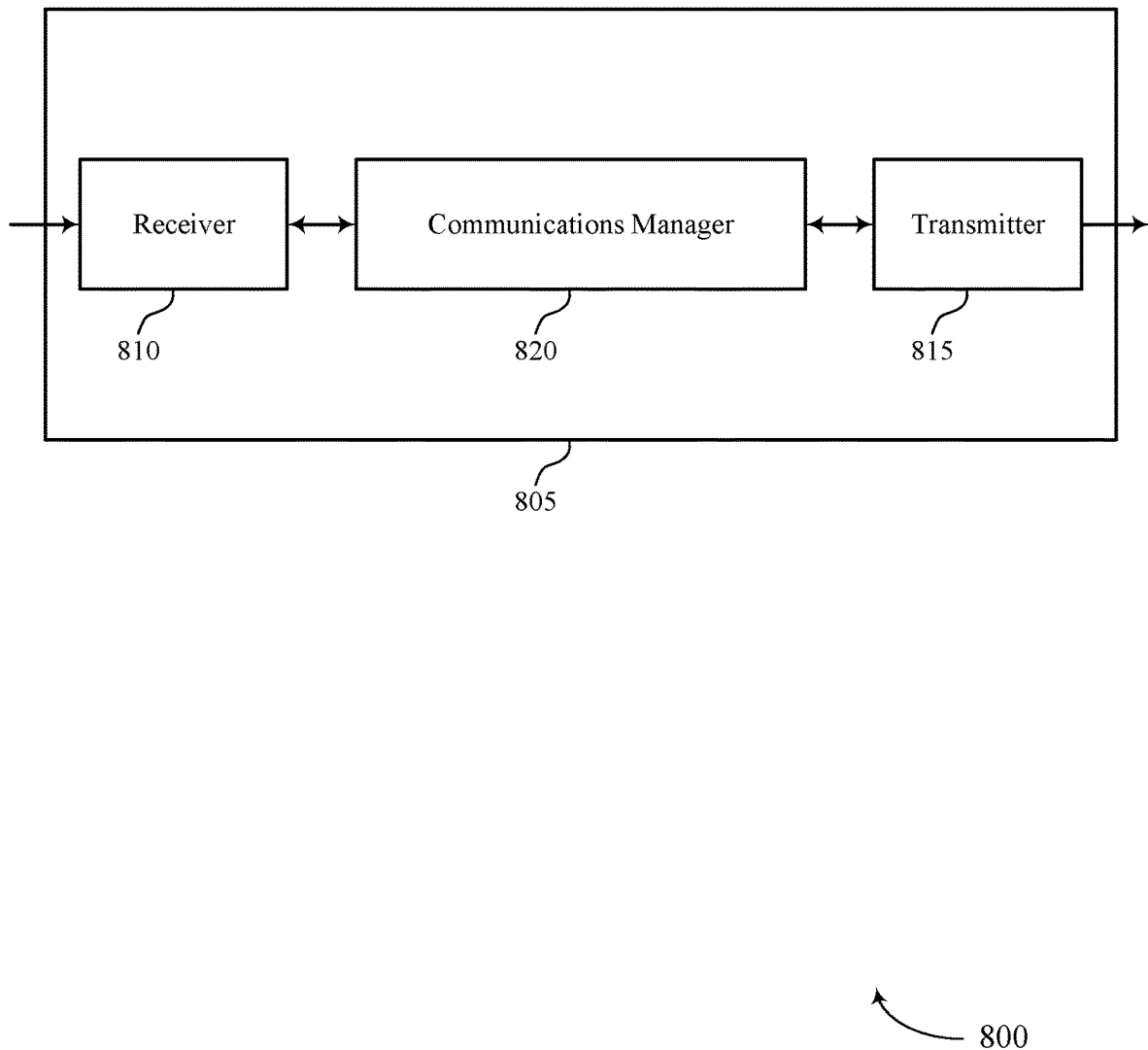
FIGS. 8 and 9 show block diagrams of devices that support communication security based on FDRSB characteristics in accordance with one or more aspects of the present disclosure.

FIG. 8 shows a block diagram 800 of a device 805 that supports communication security based on FDRSB characteristics in accordance with one or more aspects of the present disclosure. The device 805 may be an example of aspects of a UE 115 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to communication security based on FDRSB characteristics). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to communication security based on FDRSB characteristics). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of communication security based on FDRSB characteristics as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network entity in accordance with examples as disclosed herein. For example, the communications manager 820 may be configured as or otherwise support a means for receiving, using the receiver 810, first signaling that indicates one or more FDRSB parameters associated with a second network entity, the one or more FDRSB parameters associated with an imbalance between an in-phase component of the first signaling and a quadrature phase component of the first signaling. The communications manager 820 may be configured as or otherwise support a means for receiving, using the receiver 810, second signaling. The communications manager 820 may be configured as or otherwise support a means for determining whether the second network entity is a source of the second signaling based on one or more FDRSB characteristics of the second signaling and the one or more FDRSB parameters indicated by the first signaling. The communications manager 820 may be configured as or otherwise support a means for communicating with the second network entity based on determining that the second network entity is the source of the second signaling.

Additionally, or alternatively, the communications manager 820 may support wireless communication at a second network entity in accordance with examples as disclosed herein. For example, the communications manager 820 may be configured as or otherwise support a means for transmitting, using the transmitter 815, first signaling that indicates one or more FDRSB parameters associated with the second network entity, the one or more FDRSB parameters associated with an imbalance between an in-phase component of the first signaling and a quadrature phase component of the first signaling. The communications manager 820 may be configured as or otherwise support a means for generating second signaling that is configured to have one or more FDRSB characteristics. The communications manager 820 may be configured as or otherwise support a means for transmitting, using the transmitter 815, the second signaling, where the second network entity is identifiable as a source of the second signaling based on the second signaling having the one or more FDRSB characteristics and further based on the one or more FDRSB parameters indicated by the first signaling.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources. By applying an FDRSB signature to a signal, a processor of a transmitting device 805 may provide enhanced security for the signal. A processor of a receiving device 805 may receive and decode the FDRSB signature according to the techniques described herein to identify whether the source of the signal is a proper source or an intruder. The processor of the receiving device may thus refrain from responding to or acting on the signal if the source is an intruder, which may improve security, improve communication reliability, reduce power consumption, and reduce processing.

Figure 9:
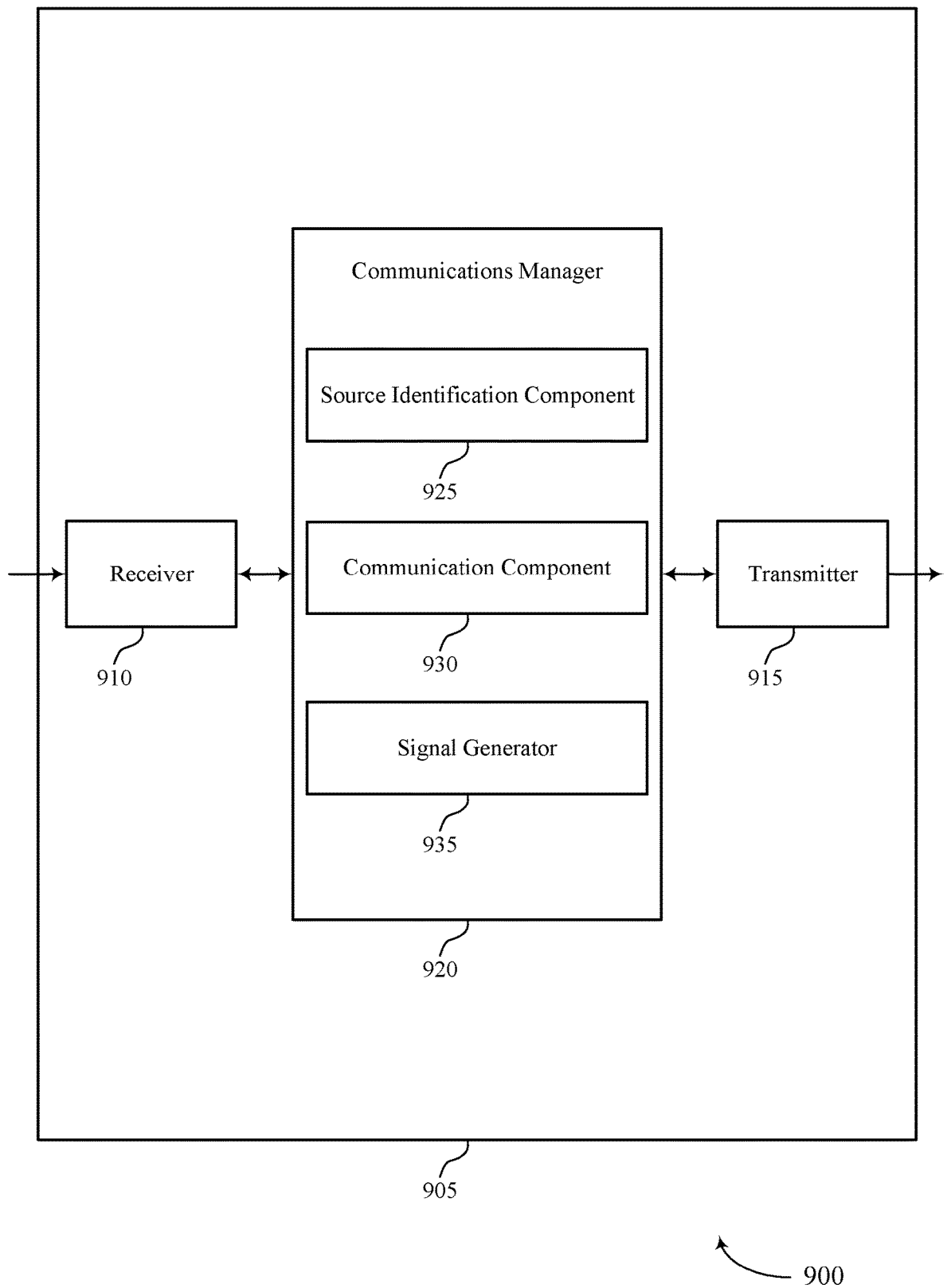

FIG. 9 shows a block diagram 900 of a device 905 that supports communication security based on FDRSB characteristics in accordance with one or more aspects of the present disclosure. The device 905 may be an example of aspects of a device 805, a UE 115, or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to communication security based on FDRSB characteristics). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to communication security based on FDRSB characteristics). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of communication security based on FDRSB characteristics as described herein. For example, the communications manager 920 may include a source identification component 925, a communication component 930, a signal generator 935, or any combination thereof. In some aspects, the receiver 910 and the transmitter 915 may be included in or coupled with the communications manager 920. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network entity in accordance with examples as disclosed herein. The receiver 910 may be configured as or otherwise support a means for receiving first signaling that indicates one or more FDRSB parameters associated with a second network entity, the one or more FDRSB parameters associated with an imbalance between an in-phase component of the first signaling and a quadrature phase component of the first signaling. The receiver 910 may be configured as or otherwise support a means for receiving second signaling. The source identification component 925 may be configured as or otherwise support a means for determining whether the second network entity is a source of the second signaling based on one or more FDRSB characteristics of the second signaling and the one or more FDRSB parameters indicated by the first signaling. The communication component 930 may be configured as or otherwise support a means for communicating (e.g., via the receiver 910, the transmitter 915, or both) with the second network entity based on determining that the second network entity is the source of the second signaling.

Additionally, or alternatively, the communications manager 920 may support wireless communication at a second network entity in accordance with examples as disclosed herein. The transmitter 915 may be configured as or otherwise support a means for transmitting first signaling that indicates one or more FDRSB parameters associated with the second network entity, the one or more FDRSB parameters associated with an imbalance between an in-phase component of the first signaling and a quadrature phase component of the first signaling. The signal generator 935 may be configured as or otherwise support a means for generating second signaling that is configured to have one or more FDRSB characteristics. The transmitter 915 may be configured as or otherwise support a means for transmitting the second signaling, where the second network entity is identifiable as a source of the second signaling based on the second signaling having the one or more FDRSB characteristics and further based on the one or more FDRSB parameters indicated by the first signaling.

Figure 10:
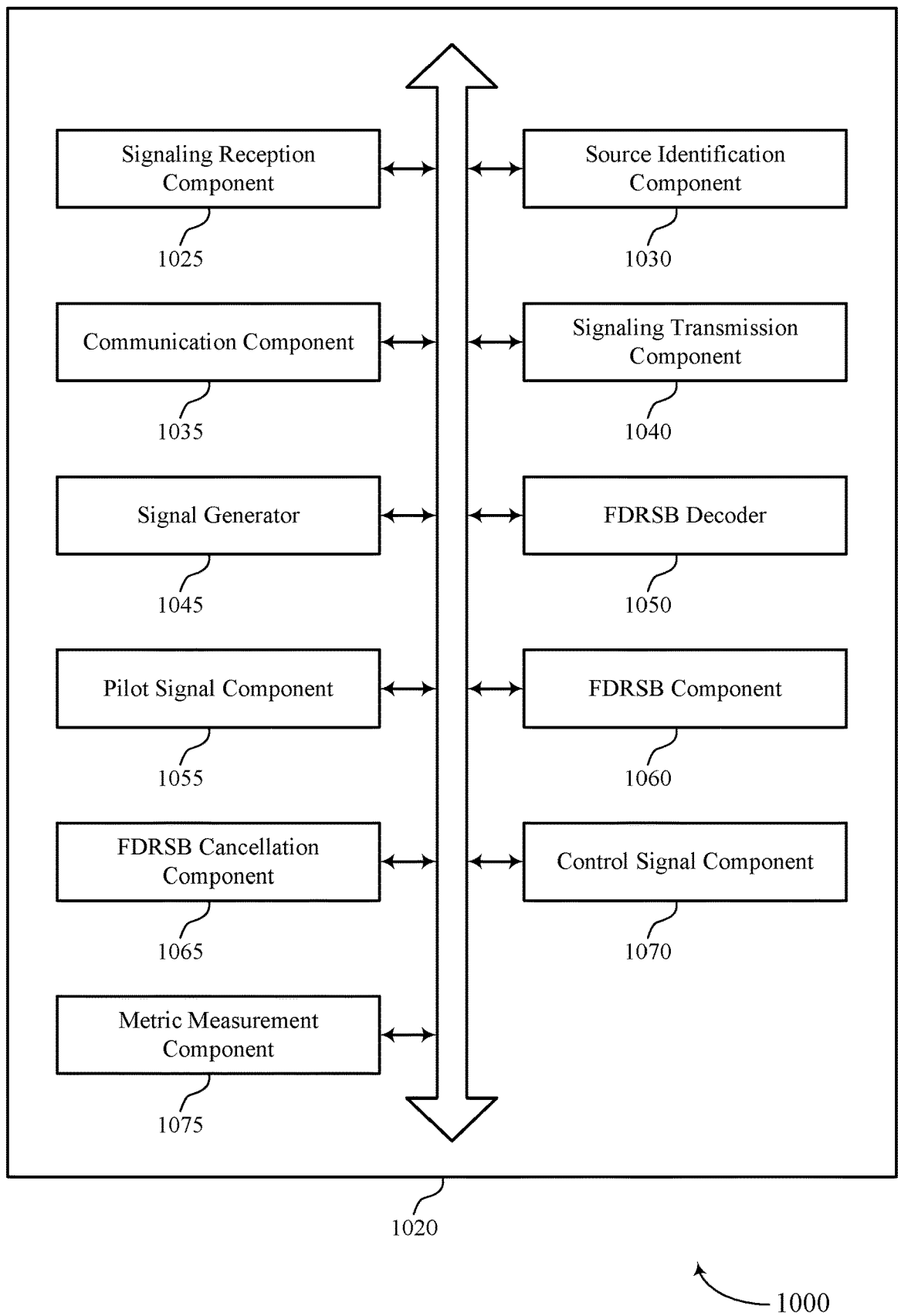
FIG. 10 shows a block diagram of a communications manager that supports communication security based on FDRSB characteristics in accordance with one or more aspects of the present disclosure.

FIG. 10 shows a block diagram 1000 of a communications manager 1020 that supports communication security based on FDRSB characteristics in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of communication security based on FDRSB characteristics as described herein. For example, the communications manager 1020 may include a signaling reception component 1025 (e.g., a receiver), a source identification component 1030, a communication component 1035, a signaling transmission component 1040 (e.g., a transmitter), a signal generator 1045, an FDRSB decoder 1050, a pilot signal component 1055, an FDRSB component 1060, an FDRSB cancellation component 1065, a control signal component 1070, a metric measurement component 1075, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a first network entity in accordance with examples as disclosed herein. The signaling reception component 1025 may be configured as or otherwise support a means for receiving first signaling that indicates one or more FDRSB parameters associated with a second network entity, the one or more FDRSB parameters associated with an imbalance between an in-phase component of the first signaling and a quadrature phase component of the first signaling. In some examples, the signaling reception component 1025 may be configured as or otherwise support a means for receiving second signaling. The source identification component 1030 may be configured as or otherwise support a means for determining whether the second network entity is a source of the second signaling based on one or more FDRSB characteristics of the second signaling and the one or more FDRSB parameters indicated by the first signaling. The communication component 1035 may be configured as or otherwise support a means for communicating with the second network entity based on determining that the second network entity is the source of the second signaling.

In some examples, the FDRSB decoder 1050 may be configured as or otherwise support a means for decoding the second signaling based on the one or more FDRSB parameters, where the one or more FDRSB parameters include one or more filter parameters for decoding the second signaling based on filtering the one or more FDRSB characteristics of the second signaling.

In some examples, to support determining whether the second network entity is the source of the second signaling, the source identification component 1030 may be configured as or otherwise support a means for determining whether the second network entity is the source of the second signaling based on comparing one or more characteristics of the decoded second signaling to one or more characteristics of signaling previously received from the second network entity.

In some examples, the signaling reception component 1025 may be configured as or otherwise support a means for receiving third signaling from the second network entity, the third signaling lacking the one or more FDRSB characteristics. In some examples, the metric measurement component 1075 may be configured as or otherwise support a means for measuring a first metric associated with the third signaling. In some examples, the metric measurement component 1075 may be configured as or otherwise support a means for measuring a second metric associated with the second signaling after decoding the second signaling. In some examples, the source identification component 1030 may be configured as or otherwise support a means for comparing a difference between the first metric and the second metric with a threshold difference, where determining that the source of the second signaling is the second network entity is based on the difference being less than the threshold difference.

In some examples, the control signal component 1070 may be configured as or otherwise support a means for receiving, from the second network entity, a RRC message or a MAC-CE that indicates the threshold difference. In some examples, the metric measurement component 1075 may be configured as or otherwise support a means for transmitting, to the second network entity, a message that indicates the difference between the first metric and the second metric. In some examples, the first metric and the second metric are signal quality metrics (e.g., SNR).

In some examples, to support receiving the first signaling, the pilot signal component 1055 may be configured as or otherwise support a means for receiving a pilot signal, where the one or more FDRSB parameters include one or more FDRSB characteristics of the pilot signal. In some examples, to support receiving the first signaling, the FDRSB component 1060 may be configured as or otherwise support a means for storing the one or more FDRSB characteristics of the pilot signal in a memory of the first network entity.

In some examples, to support determining whether the second network entity is the source of the second signaling, the FDRSB component 1060 may be configured as or otherwise support a means for determining the one or more FDRSB characteristics of the second signaling. In some examples, to support determining whether the second network entity is the source of the second signaling, the FDRSB component 1060 may be configured as or otherwise support a means for determining a difference between the one or more FDRSB characteristics of the second signaling and the one or more FDRSB characteristics of the pilot signal. In some examples, to support determining whether the second network entity is the source of the second signaling, the source identification component 1030 may be configured as or otherwise support a means for determining that the second network entity is the source of the second signaling based on the difference being less than a threshold difference. In some examples, the control signal component 1070 may be configured as or otherwise support a means for receiving, from the second network entity, a RRC message or a MAC-CE that indicates the threshold difference.

In some examples, the control signal component 1070 may be configured as or otherwise support a means for receiving, from the second network entity, control signaling that indicates an index of the pilot signal. In some examples, receiving the pilot signal may include receiving, from the second network entity, a set of multiple pilot signals including the pilot signal. In some examples, other pilot signals of the set of multiple pilot signals different than the pilot signal may have different FDRSB characteristics than the one or more FDRSB characteristics of the pilot signal. In some examples, storing the one or more FDRSB characteristics of the pilot signal in the memory of the first network entity may be based on the control signaling indicating the index of the pilot signal. In some examples, the second signaling includes physical layer signaling.

Additionally, or alternatively, the communications manager 1020 may support wireless communication at a second network entity in accordance with examples as disclosed herein. The signaling transmission component 1040 may be configured as or otherwise support a means for transmitting first signaling that indicates one or more FDRSB parameters associated with the second network entity, the one or more FDRSB parameters associated with an imbalance between an in-phase component of the first signaling and a quadrature phase component of the first signaling. The signal generator 1045 may be configured as or otherwise support a means for generating second signaling that is configured to have one or more FDRSB characteristics. In some examples, the signaling transmission component 1040 may be configured as or otherwise support a means for transmitting the second signaling, where the second network entity is identifiable as a source of the second signaling based on the second signaling having the one or more FDRSB characteristics and further based on the one or more FDRSB parameters indicated by the first signaling.

In some examples, the one or more FDRSB parameters include one or more filter parameters for decoding the second signaling based on filtering the one or more FDRSB characteristics of the second signaling.

In some examples, to support generating the second signaling, the FDRSB cancellation component 1065 may be configured as or otherwise support a means for deactivating, bypassing, or refraining from using a cancellation component configured to cancel the one or more FDRSB characteristics, where the second signaling is configured to have the one or more FDRSB characteristics based on deactivating, bypassing, or refraining from using the cancellation component.

In some examples, to support generating the second signaling, the FDRSB cancellation component 1065 may be configured as or otherwise support a means for removing one or more first FDRSB characteristics from the second signaling. In some examples, to support generating the second signaling, the FDRSB component 1060 may be configured as or otherwise support a means for applying, before or after removing the one or more first FDRSB characteristics, the one or more FDRSB characteristics to the second signaling.

In some examples, the signal generator 1045 may be configured as or otherwise support a means for generating third signaling that is configured to lack the one or more FDRSB characteristics. In some examples, the signaling transmission component 1040 may be configured as or otherwise support a means for transmitting the third signaling. In some examples, the control signal component 1070 may be configured as or otherwise support a means for transmitting control signaling that indicates a threshold difference between a first metric associated with the second signaling and a second metric associated with the third signaling, where the second network entity is identifiable as the source of the second signaling based on a difference between the first metric and the second metric being less than the threshold difference.

In some examples, the metric measurement component 1075 may be configured as or otherwise support a means for receiving a message that indicates the difference between the first metric and the second metric. In some examples, the control signaling includes an RRC message or a MAC-CE.

In some examples, to support transmitting the first signaling, the pilot signal component 1055 may be configured as or otherwise support a means for transmitting a pilot signal, where the one or more FDRSB parameters include one or more FDRSB characteristics of the pilot signal, and where the second network entity is identifiable as the source of the second signaling based on a difference between the one or more FDRSB characteristics of the second signaling and the one or more FDRSB characteristics of the pilot signal being less than a threshold difference.

In some examples, the control signal component 1070 may be configured as or otherwise support a means for transmitting control signaling that indicates an index of the pilot signal. In some examples, transmitting the pilot signal may include transmitting a set of multiple pilot signals including the pilot signal. In some examples, other pilot signals of the set of multiple pilot signals different than the pilot signal may be configured to have different FDRSB characteristics than the one or more FDRSB characteristics of the pilot signal. In some examples, the pilot signal may be identifiable from among the set of multiple pilot signals based on the index.

In some examples, the control signal component 1070 may be configured as or otherwise support a means for transmitting a RRC message or a MAC-CE that indicates the threshold difference. In some examples, the second signaling includes physical layer signaling.

Figure 11:
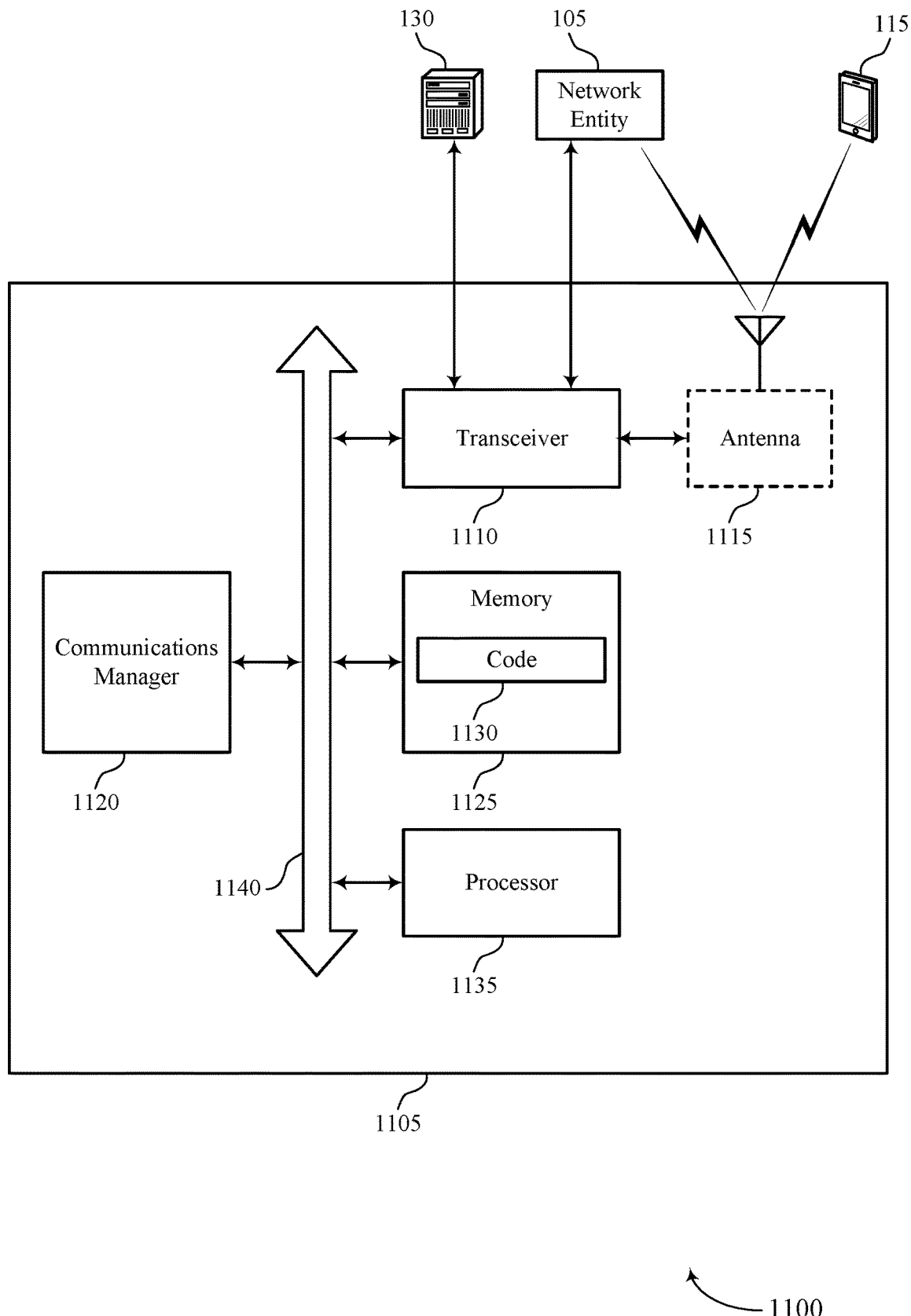
FIG. 11 shows a diagram of a system including a UE that supports communication security based on FDRSB characteristics in accordance with one or more aspects of the present disclosure.

FIG. 11 shows a diagram of a system 1100 including a device 1105 that supports communication security based on FDRSB characteristics in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include random access memory (RAM) and read-only memory (ROM). The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a basic input/output (I/O) system (BIOS) which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting communication security based on FDRSB characteristics). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a first network entity in accordance with examples as disclosed herein. For example, the communications manager 1120 may be configured as or otherwise support a means for receiving first signaling that indicates one or more FDRSB parameters associated with a second network entity, the one or more FDRSB parameters associated with an imbalance between an in-phase component of the first signaling and a quadrature phase component of the first signaling. The communications manager 1120 may be configured as or otherwise support a means for receiving second signaling. The communications manager 1120 may be configured as or otherwise support a means for determining whether the second network entity is a source of the second signaling based on one or more FDRSB characteristics of the second signaling and the one or more FDRSB parameters indicated by the first signaling. The communications manager 1120 may be configured as or otherwise support a means for communicating with the second network entity based on determining that the second network entity is the source of the second signaling.

Additionally, or alternatively, the communications manager 1120 may support wireless communication at a second network entity in accordance with examples as disclosed herein. For example, the communications manager 1120 may be configured as or otherwise support a means for transmitting first signaling that indicates one or more FDRSB parameters associated with the second network entity, the one or more FDRSB parameters associated with an imbalance between an in-phase component of the first signaling and a quadrature phase component of the first signaling. The communications manager 1120 may be configured as or otherwise support a means for generating second signaling that is configured to have one or more FDRSB characteristics. The communications manager 1120 may be configured as or otherwise support a means for transmitting the second signaling, where the second network entity is identifiable as a source of the second signaling based on the second signaling having the one or more FDRSB characteristics and further based on the one or more FDRSB parameters indicated by the first signaling.

By including or configuring the communications manager 1120 in accordance with examples as described herein, the device 1105 may support techniques for improved communication reliability, reduced latency, reduced power consumption, more efficient utilization of communication resources, improved coordination between devices, and longer battery life. For example, the device 1105 may communication security based on FDRSB characteristics. If the device 1105 is a transmitting device, the device 1105 may apply an FDRSB signature (e.g., FDRSB characteristics) to a transmitted signal. The FDRSB signature may be unique to the device 1105, such that receiving devices may identify the device 1105 as a source of the signal, which may improve communication reliability and coordination between devices. If the device 1105 is a receiving device, the device 1105 may decode FDRSB characteristics of each received signal and compare the FDRSB characteristics with one or more classification metrics, such as an expected FDRSB signature. The device 1105 may refrain from responding to or acting on information included in the signal if the source identified by the device 1105 is different than an expected source. Thus, the described security techniques based on FDRSB may improve security and communication reliability, and reduce power consumption and processing associated with decoding and responding to intruder signals.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of communication security based on FDRSB characteristics as described herein, or the processor 1135 and the memory 1125 may be otherwise configured to perform or support such operations.

Figure 12:
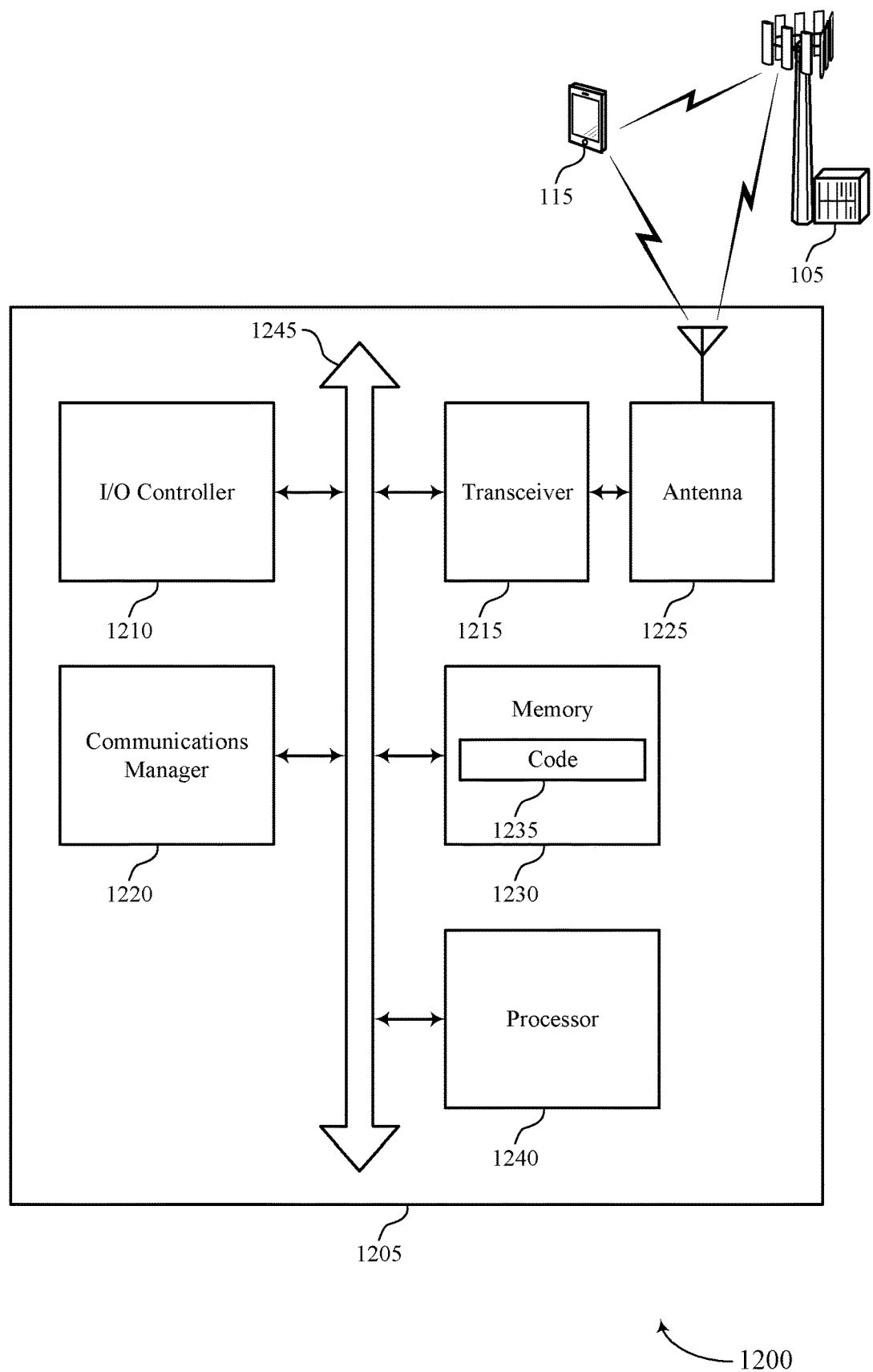
FIG. 12 shows a diagram of a system including a network entity that supports communication security based on FDRSB characteristics in accordance with one or more aspects of the present disclosure.

FIG. 12 shows a diagram of a system 1200 including a device 1205 that supports communication security based on FDRSB characteristics in accordance with one or more aspects of the present disclosure. The device 1205 may be an example of or include the components of a device 805, a device 905, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 815, a transmitter 915, a receiver 810, a receiver 910, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting communication security based on FDRSB characteristics). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a first network entity in accordance with examples as disclosed herein. For example, the communications manager 1220 may be configured as or otherwise support a means for receiving first signaling that indicates one or more FDRSB parameters associated with a second network entity, the one or more FDRSB parameters associated with an imbalance between an in-phase component of the first signaling and a quadrature phase component of the first signaling. The communications manager 1220 may be configured as or otherwise support a means for receiving second signaling. The communications manager 1220 may be configured as or otherwise support a means for determining whether the second network entity is a source of the second signaling based on one or more FDRSB characteristics of the second signaling and the one or more FDRSB parameters indicated by the first signaling. The communications manager 1220 may be configured as or otherwise support a means for communicating with the second network entity based on determining that the second network entity is the source of the second signaling.

Additionally, or alternatively, the communications manager 1220 may support wireless communication at a second network entity in accordance with examples as disclosed herein. For example, the communications manager 1220 may be configured as or otherwise support a means for transmitting first signaling that indicates one or more FDRSB parameters associated with the second network entity, the one or more FDRSB parameters associated with an imbalance between an in-phase component of the first signaling and a quadrature phase component of the first signaling. The communications manager 1220 may be configured as or otherwise support a means for generating second signaling that is configured to have one or more FDRSB characteristics. The communications manager 1220 may be configured as or otherwise support a means for transmitting the second signaling, where the second network entity is identifiable as a source of the second signaling based on the second signaling having the one or more FDRSB characteristics and further based on the one or more FDRSB parameters indicated by the first signaling.

By including or configuring the communications manager 1220 in accordance with examples as described herein, the device 1205 may support techniques for improved communication reliability, reduced latency, reduced power consumption, more efficient utilization of communication resources, improved coordination between devices, and longer battery life. For example, the device 1205 may communication security based on FDRSB characteristics. If the device 1205 is a transmitting device, the device 1205 may apply an FDRSB signature (e.g., FDRSB characteristics) to a transmitted signal. The FDRSB signature may be unique to the device 1205, such that receiving devices may identify the device 1205 as a source of the signal, which may improve communication reliability and coordination between devices. If the device 1205 is a receiving device, the device 1205 may decode FDRSB characteristics of each received signal and compare the FDRSB characteristics with one or more classification metrics, such as an expected FDRSB signature. The device 1205 may refrain from responding to or acting on information included in the signal if the source identified by the device 1205 is different than an expected source. Thus, the described security techniques based on FDRSB may improve security and communication reliability, and reduce power consumption and processing associated with decoding and responding to intruder signals.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of communication security based on FDRSB characteristics as described herein, or the processor 1240 and the memory 1230 may be otherwise configured to perform or support such operations.

Figure 13:
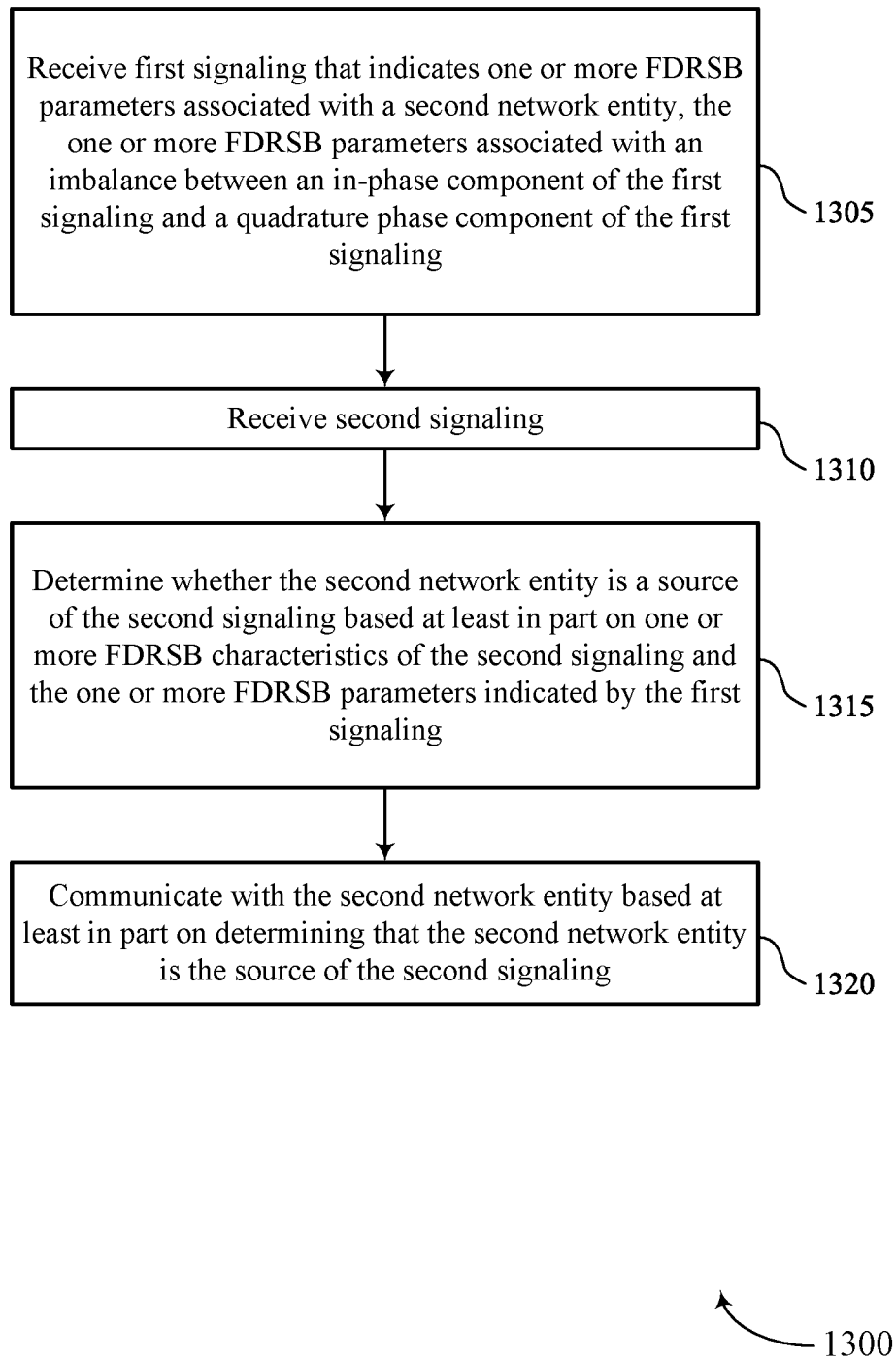
FIGS. 13 through 18 show flowcharts illustrating methods that support communication security based on FDRSB characteristics in accordance with one or more aspects of the present disclosure.

FIG. 13 shows a flowchart illustrating a method 1300 that supports communication security based on FDRSB characteristics in accordance with one or more aspects of the present disclosure. The operations of the method 1300 may be implemented by a network entity or a UE or its components as described herein. For example, the operations of the method 1300 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1305, the method may include receiving first signaling that indicates one or more FDRSB parameters associated with a second network entity, the one or more FDRSB parameters associated with an imbalance between an in-phase component of the first signaling and a quadrature phase component of the first signaling. The operations of 1305 may be performed in accordance with examples as disclosed herein. In some examples, aspects of the operations of 1305 may be performed by a signaling reception component 1025 as described with reference to FIG. 10.

At 1310, the method may include receiving second signaling. The operations of 1310 may be performed in accordance with examples as disclosed herein. In some examples, aspects of the operations of 1310 may be performed by a signaling reception component 1025 as described with reference to FIG. 10.

At 1315, the method may include determining whether the second network entity is a source of the second signaling based on one or more FDRSB characteristics of the second signaling and the one or more FDRSB parameters indicated by the first signaling. The operations of 1315 may be performed in accordance with examples as disclosed herein. In some examples, aspects of the operations of 1315 may be performed by a source identification component 1030 as described with reference to FIG. 10.

At 1320, the method may include communicating with the second network entity based on determining that the second network entity is the source of the second signaling. The operations of 1320 may be performed in accordance with examples as disclosed herein. In some examples, aspects of the operations of 1320 may be performed by a communication component 1035 as described with reference to FIG. 10.

Figure 14:
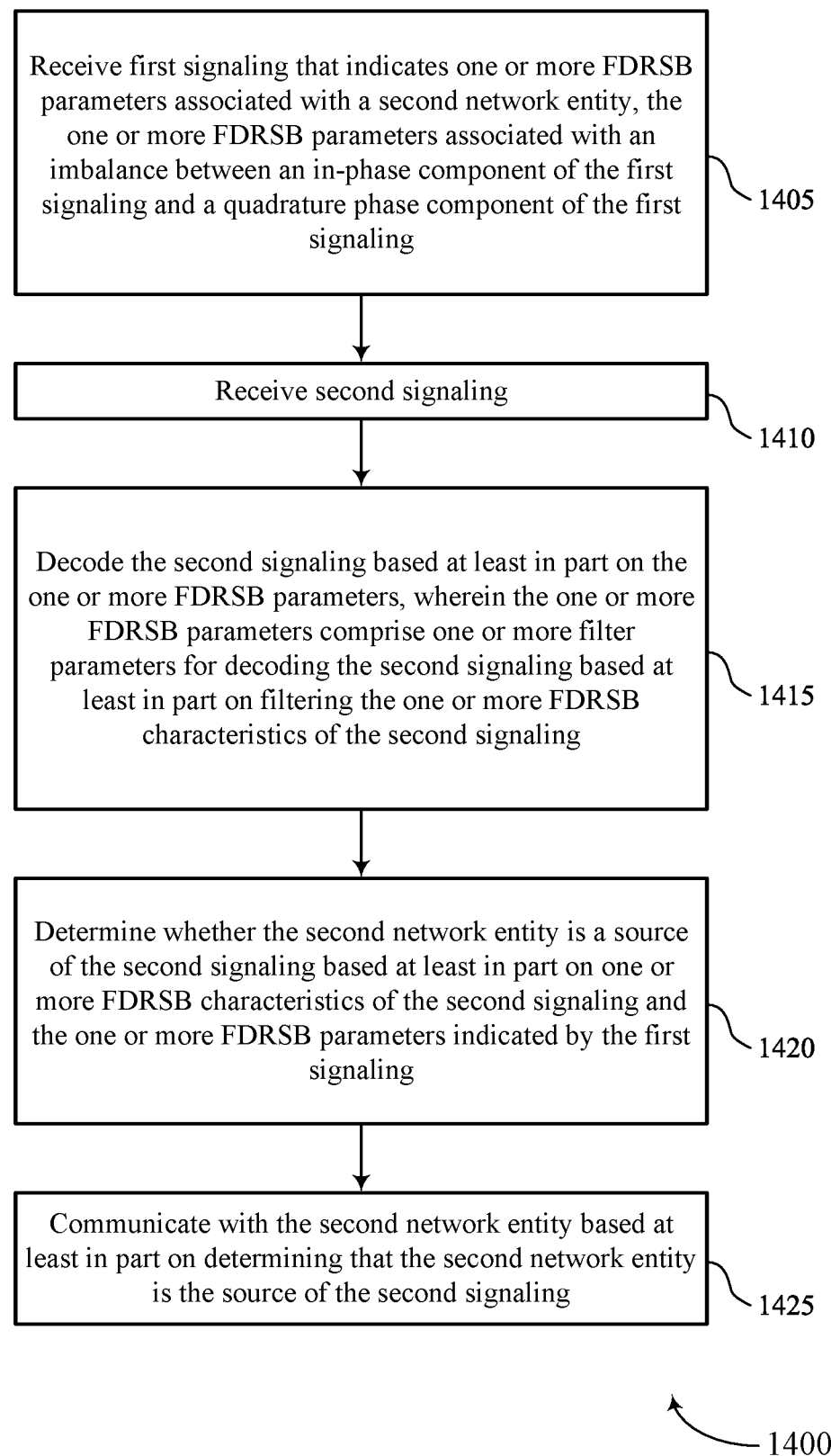

FIG. 14 shows a flowchart illustrating a method 1400 that supports communication security based on FDRSB characteristics in accordance with one or more aspects of the present disclosure. The operations of the method 1400 may be implemented by a network entity or a UE or its components as described herein. For example, the operations of the method 1400 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1405, the method may include receiving first signaling that indicates one or more FDRSB parameters associated with a second network entity, the one or more FDRSB parameters associated with an imbalance between an in-phase component of the first signaling and a quadrature phase component of the first signaling. The operations of 1405 may be performed in accordance with examples as disclosed herein. In some examples, aspects of the operations of 1405 may be performed by a signaling reception component 1025 as described with reference to FIG. 10.

At 1410, the method may include receiving second signaling. The operations of 1410 may be performed in accordance with examples as disclosed herein. In some examples, aspects of the operations of 1410 may be performed by a signaling reception component 1025 as described with reference to FIG. 10.

At 1415, the method may include decoding the second signaling based on the one or more FDRSB parameters, where the one or more FDRSB parameters include one or more filter parameters for decoding the second signaling based on filtering the one or more FDRSB characteristics of the second signaling. The operations of 1415 may be performed in accordance with examples as disclosed herein. In some examples, aspects of the operations of 1415 may be performed by an FDRSB decoder 1050 as described with reference to FIG. 10.

At 1420, the method may include determining whether the second network entity is a source of the second signaling based on one or more FDRSB characteristics of the second signaling and the one or more FDRSB parameters indicated by the first signaling. The operations of 1420 may be performed in accordance with examples as disclosed herein. In some examples, aspects of the operations of 1420 may be performed by a source identification component 1030 as described with reference to FIG. 10.

At 1425, the method may include communicating with the second network entity based on determining that the second network entity is the source of the second signaling. The operations of 1425 may be performed in accordance with examples as disclosed herein. In some examples, aspects of the operations of 1425 may be performed by a communication component 1035 as described with reference to FIG. 10.

Figure 15:
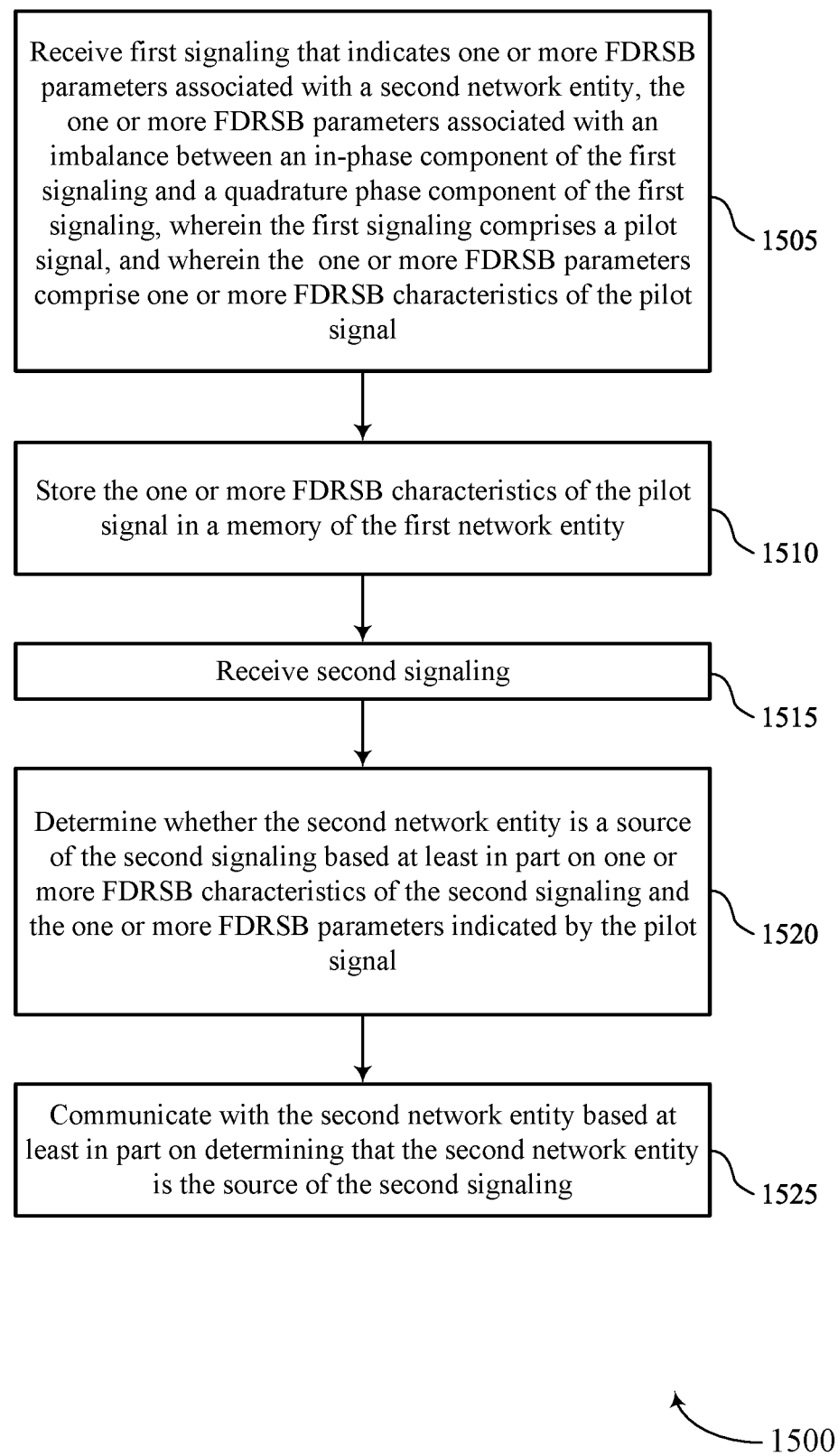

FIG. 15 shows a flowchart illustrating a method 1500 that supports communication security based on FDRSB characteristics in accordance with one or more aspects of the present disclosure. The operations of the method 1500 may be implemented by a network entity or a UE or its components as described herein. For example, the operations of the method 1500 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1505, the method may include receiving first signaling that indicates one or more FDRSB parameters associated with a second network entity, the one or more FDRSB parameters associated with an imbalance between an in-phase component of the first signaling and a quadrature phase component of the first signaling. In some examples, the first signaling may be a pilot signal, and the one or more FDRSB parameters may be one or more FDRSB characteristics of the pilot signal. The operations of 1505 may be performed in accordance with examples as disclosed herein. In some examples, aspects of the operations of 1505 may be performed by a signaling reception component 1025 or a pilot signal component 1035 as described with reference to FIG. 10.

At 1510, the method may include storing the one or more FDRSB characteristics of the pilot signal in a memory of the first network entity. The operations of 1510 may be performed in accordance with examples as disclosed herein. In some examples, aspects of the operations of 1510 may be performed by an FDRSB component 1060 as described with reference to FIG. 10.

At 1515, the method may include receiving second signaling. The operations of 1515 may be performed in accordance with examples as disclosed herein. In some examples, aspects of the operations of 1515 may be performed by a signaling reception component 1025 as described with reference to FIG. 10.

At 1520, the method may include determining whether the second network entity is a source of the second signaling based on one or more FDRSB characteristics of the second signaling and the one or more FDRSB parameters indicated by the pilot signal. The operations of 1520 may be performed in accordance with examples as disclosed herein. In some examples, aspects of the operations of 1520 may be performed by a source identification component 1030 as described with reference to FIG. 10.

At 1525, the method may include communicating with the second network entity based on determining that the second network entity is the source of the second signaling. The operations of 1525 may be performed in accordance with examples as disclosed herein. In some examples, aspects of the operations of 1525 may be performed by a communication component 1035 as described with reference to FIG. 10.

Figure 16:
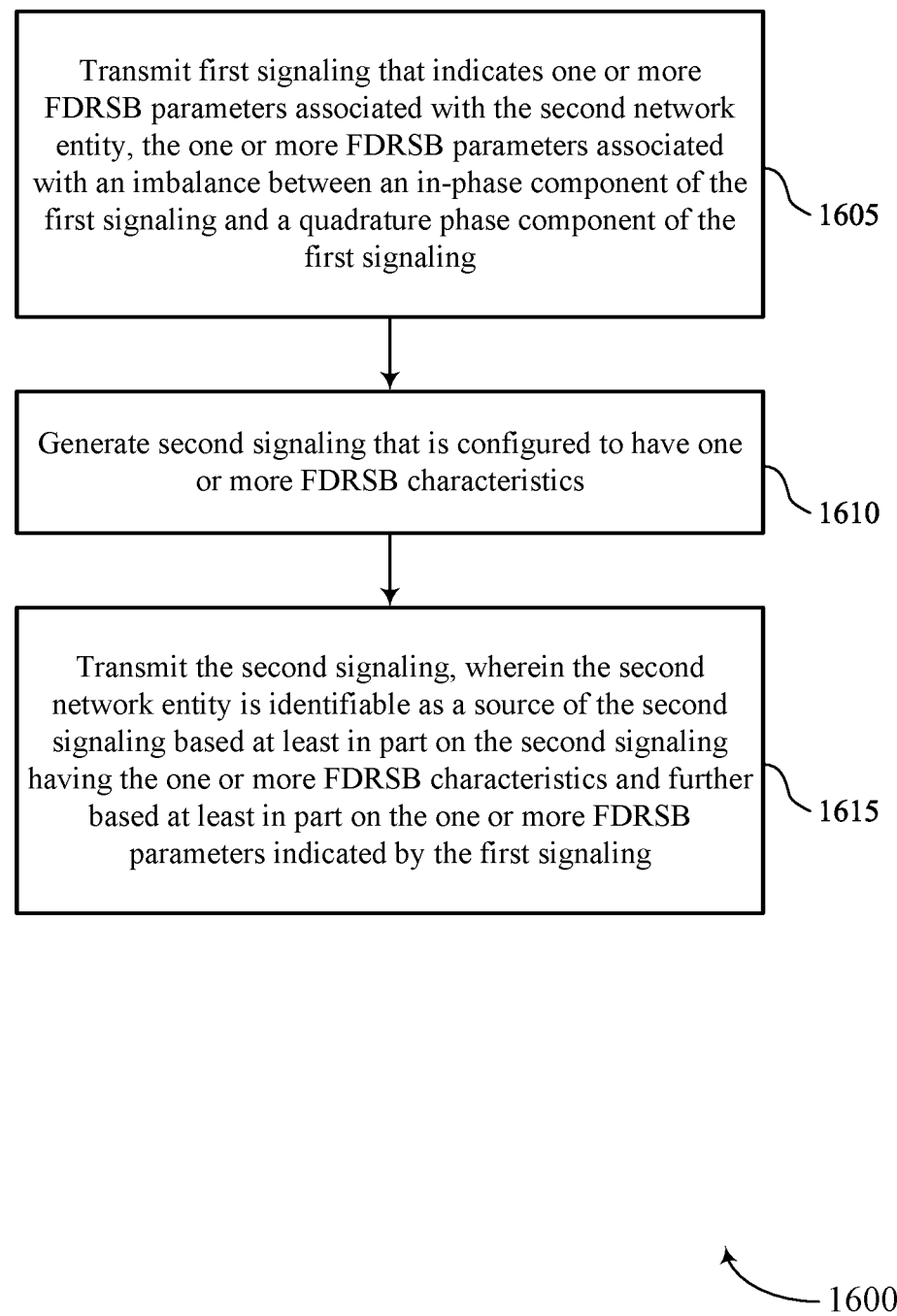

FIG. 16 shows a flowchart illustrating a method 1600 that supports communication security based on FDRSB characteristics in accordance with one or more aspects of the present disclosure. The operations of the method 1600 may be implemented by a network entity or a UE or its components as described herein. For example, the operations of the method 1600 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1605, the method may include transmitting first signaling that indicates one or more FDRSB parameters associated with the second network entity, the one or more FDRSB parameters associated with an imbalance between an in-phase component of the first signaling and a quadrature phase component of the first signaling. The operations of 1605 may be performed in accordance with examples as disclosed herein. In some examples, aspects of the operations of 1605 may be performed by a signaling transmission component 1040 as described with reference to FIG. 10.

At 1610, the method may include generating second signaling that is configured to have one or more FDRSB characteristics. The operations of 1610 may be performed in accordance with examples as disclosed herein. In some examples, aspects of the operations of 1610 may be performed by a signal generator 1045 as described with reference to FIG. 10.

At 1615, the method may include transmitting the second signaling, where the second network entity is identifiable as a source of the second signaling based on the second signaling having the one or more FDRSB characteristics and further based on the one or more FDRSB parameters indicated by the first signaling. The operations of 1615 may be performed in accordance with examples as disclosed herein. In some examples, aspects of the operations of 1615 may be performed by a signaling transmission component 1040 as described with reference to FIG. 10.

Figure 17:
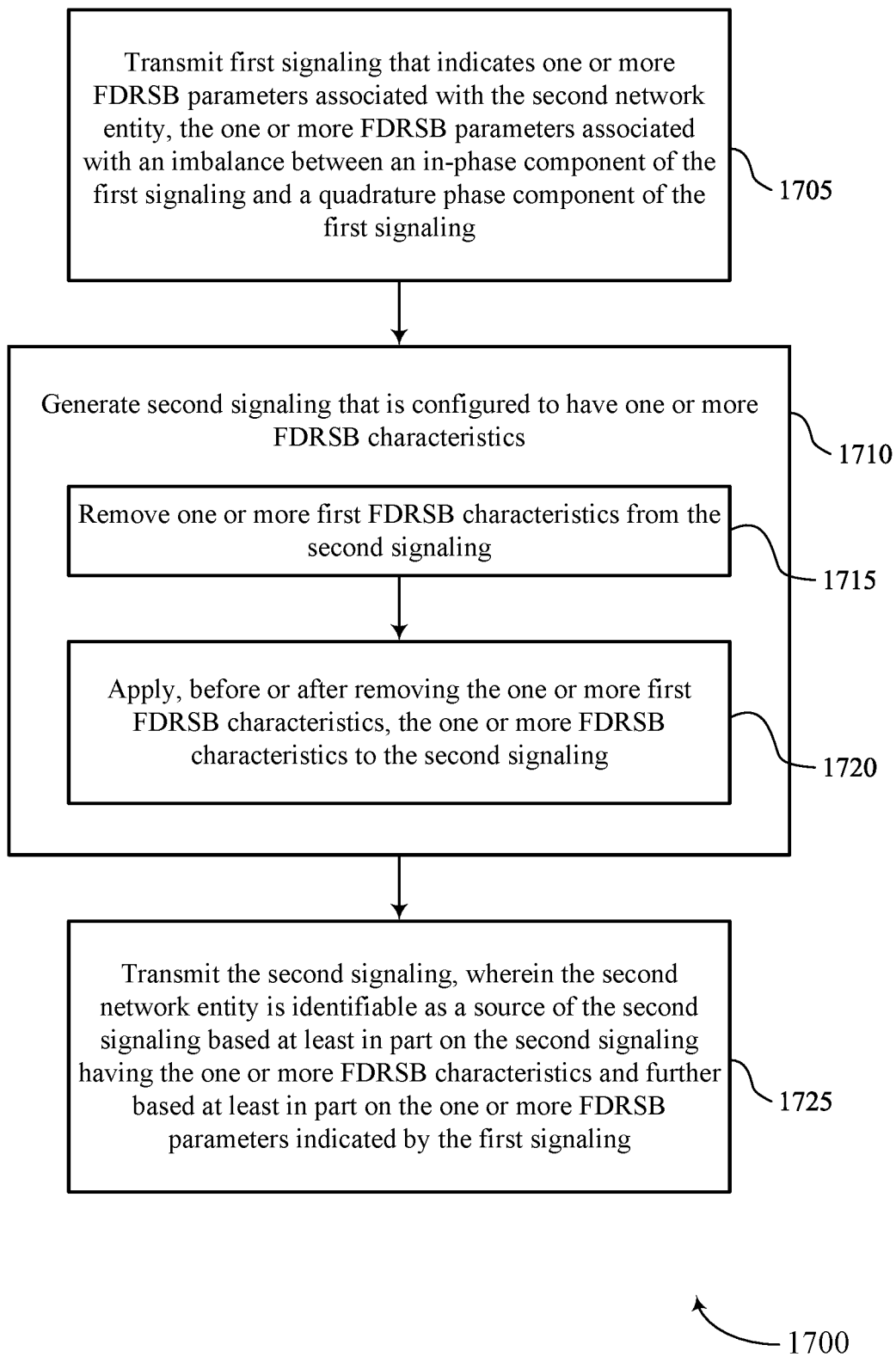

FIG. 17 shows a flowchart illustrating a method 1700 that supports communication security based on FDRSB characteristics in accordance with one or more aspects of the present disclosure. The operations of the method 1700 may be implemented by a network entity or a UE or its components as described herein. For example, the operations of the method 1700 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1705, the method may include transmitting first signaling that indicates one or more FDRSB parameters associated with the second network entity, the one or more FDRSB parameters associated with an imbalance between an in-phase component of the first signaling and a quadrature phase component of the first signaling. The operations of 1705 may be performed in accordance with examples as disclosed herein. In some examples, aspects of the operations of 1705 may be performed by a signaling transmission component 1040 as described with reference to FIG. 10.

At 1710, the method may include generating second signaling that is configured to have one or more FDRSB characteristics. The operations of 1710 may be performed in accordance with examples as disclosed herein. In some examples, aspects of the operations of 1710 may be performed by a signal generator 1045 as described with reference to FIG. 10.

At 1715, the method may include removing one or more first FDRSB characteristics from the second signaling. The operations of 1715 may be performed in accordance with examples as disclosed herein. In some examples, aspects of the operations of 1715 may be performed by an FDRSB cancellation component 1065 as described with reference to FIG. 10.

Removing one or more first FDRSB characteristics from the second signaling may include, at 1720, applying, before or after removing the one or more first FDRSB characteristics, the one or more FDRSB characteristics to the second signaling. The operations of 1720 may be performed in accordance with examples as disclosed herein. In some examples, aspects of the operations of 1720 may be performed by an FDRSB component 1060 as described with reference to FIG. 10.

Removing one or more first FDRSB characteristics from the second signaling may further include, at 1725, transmitting the second signaling, where the second network entity is identifiable as a source of the second signaling based on the second signaling having the one or more FDRSB characteristics and further based on the one or more FDRSB parameters indicated by the first signaling. The operations of 1725 may be performed in accordance with examples as disclosed herein. In some examples, aspects of the operations of 1725 may be performed by a signaling transmission component 1040 as described with reference to FIG. 10.

Figure 18:
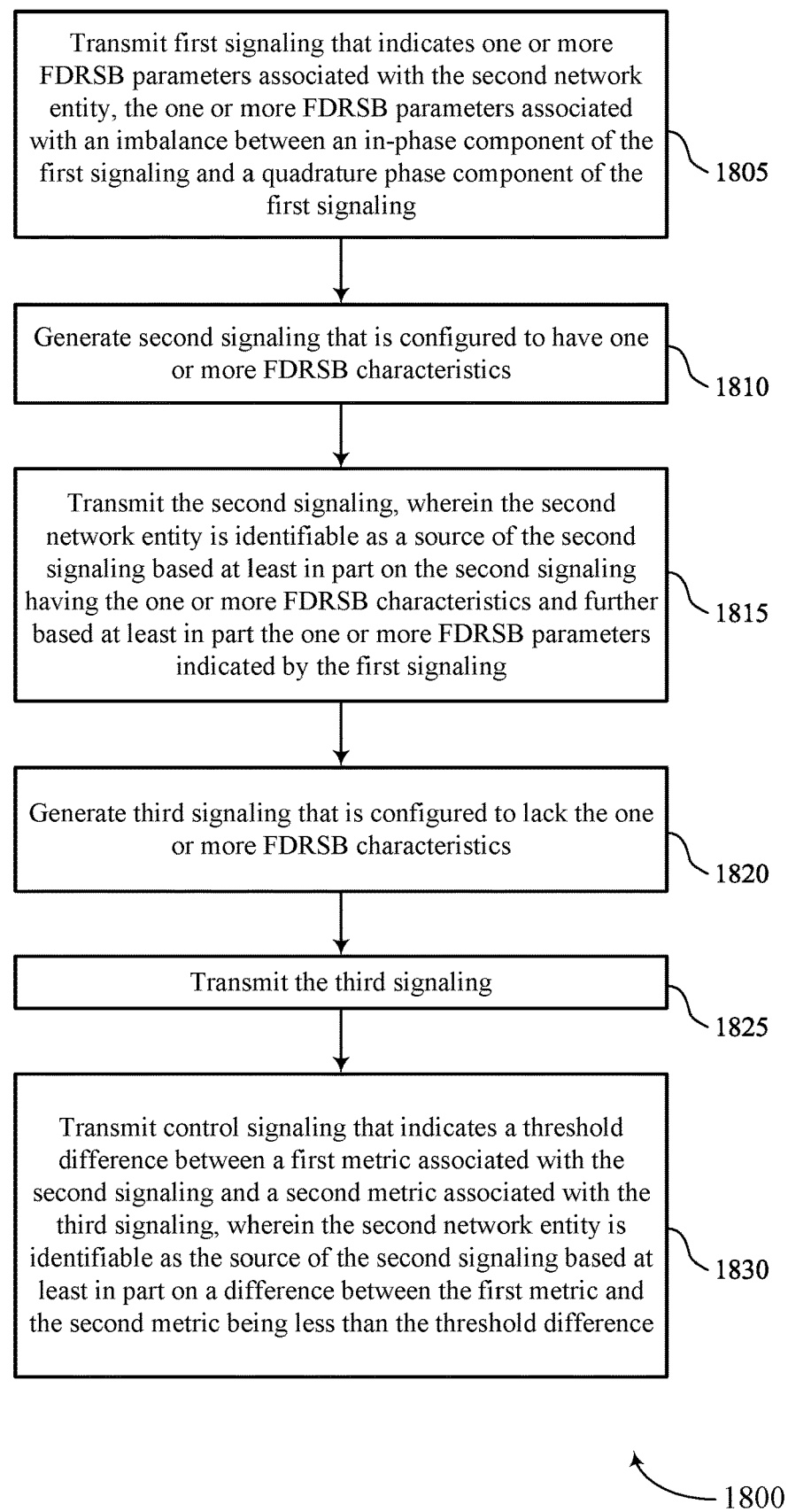

FIG. 18 shows a flowchart illustrating a method 1800 that supports communication security based on FDRSB characteristics in accordance with one or more aspects of the present disclosure. The operations of the method 1800 may be implemented by a network entity or a UE or its components as described herein. For example, the operations of the method 1800 may be performed by a network entity or a UE 115 as described with reference to FIGS. 1 through 12. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1805, the method may include transmitting first signaling that indicates one or more FDRSB parameters associated with the second network entity, the one or more FDRSB parameters associated with an imbalance between an in-phase component of the first signaling and a quadrature phase component of the first signaling. The operations of 1805 may be performed in accordance with examples as disclosed herein. In some examples, aspects of the operations of 1805 may be performed by a signaling transmission component 1040 as described with reference to FIG. 10.

At 1810, the method may include generating second signaling that is configured to have one or more FDRSB characteristics. The operations of 1810 may be performed in accordance with examples as disclosed herein. In some examples, aspects of the operations of 1810 may be performed by a signal generator 1045 as described with reference to FIG. 10.

At 1815, the method may include transmitting the second signaling, where the second network entity is identifiable as a source of the second signaling based on the second signaling having the one or more FDRSB characteristics and further based on the one or more FDRSB parameters indicated by the first signaling. The operations of 1815 may be performed in accordance with examples as disclosed herein. In some examples, aspects of the operations of 1815 may be performed by a signaling transmission component 1040 as described with reference to FIG. 10.

At 1820, the method may include generating third signaling that is configured to lack the one or more FDRSB characteristics. The operations of 1820 may be performed in accordance with examples as disclosed herein. In some examples, aspects of the operations of 1820 may be performed by a signal generator 1045 as described with reference to FIG. 10.

At 1825, the method may include transmitting the third signaling. The operations of 1825 may be performed in accordance with examples as disclosed herein. In some examples, aspects of the operations of 1825 may be performed by a signaling transmission component 1040 as described with reference to FIG. 10.

At 1830, the method may include transmitting control signaling that indicates a threshold difference between a first metric associated with the second signaling and a second metric associated with the third signaling, where the second network entity is identifiable as the source of the second signaling based on a difference between the first metric and the second metric being less than the threshold difference. The operations of 1830 may be performed in accordance with examples as disclosed herein. In some examples, aspects of the operations of 1830 may be performed by a control signal component 1070 as described with reference to FIG. 10.

The following provides an overview of aspects of the present disclosure:

Aspect 1: A method for wireless communication at a first network entity, comprising: receiving first signaling that indicates one or more FDRSB parameters associated with a second network entity, the one or more FDRSB parameters associated with an imbalance between an in-phase component of the first signaling and a quadrature phase component of the first signaling; receiving second signaling; determining whether the second network entity is a source of the second signaling based at least in part on one or more FDRSB characteristics of the second signaling and the one or more FDRSB parameters indicated by the first signaling; and communicating with the second network entity based at least in part on determining that the second network entity is the source of the second signaling.

Aspect 2: The method of aspect 1, further comprising: decoding the second signaling based at least in part on the one or more FDRSB parameters, wherein the one or more FDRSB parameters comprise one or more filter parameters for decoding the second signaling based at least in part on filtering the one or more FDRSB characteristics of the second signaling.

Aspect 3: The method of aspect 2, wherein determining whether the second network entity is the source of the second signaling comprises: determining whether the second network entity is the source of the second signaling based at least in part on comparing one or more characteristics of the decoded second signaling to one or more characteristics of signaling previously received from the second network entity.

4: The method of aspect 2, further comprising: receiving third signaling from the second network entity, the third signaling lacking the one or more FDRSB characteristics; measuring a first metric associated with the third signaling; measuring a second metric associated with the second signaling after decoding the second signaling; and comparing a difference between the first metric and the second metric with a threshold difference, wherein determining that the source of the second signaling is the second network entity is based at least in part on the difference being less than the threshold difference.

Aspect 5: The method of aspect 4, further comprising: receiving, from the second network entity, an RRC message or a MAC-CE that indicates the threshold difference.

Aspect 6: The method of any of aspects 4 through 5, further comprising: transmitting, to the second network entity, a message that indicates the difference between the first metric and the second metric.

Aspect 7: The method of any of aspects 4 through 6, wherein the first metric and the second metric are signal quality metrics.

Aspect 8: The method of aspect 1, wherein receiving the first signaling comprises receiving a pilot signal, wherein the one or more FDRSB parameters comprise one or more FDRSB characteristics of the pilot signal, the method further comprising: storing the one or more FDRSB characteristics of the pilot signal in a memory of the first network entity.

Aspect 9: The method of aspect 8, wherein determining whether the second network entity is the source of the second signaling comprises: determining the one or more FDRSB characteristics of the second signaling; determining a difference between the one or more FDRSB characteristics of the second signaling and the one or more FDRSB characteristics of the pilot signal; and determining that the second network entity is the source of the second signaling based at least in part on the difference being less than a threshold difference.

Aspect 10: The method of aspect 9, further comprising: receiving, from the second network entity, an RRC message or a MAC-CE that indicates the threshold difference.

Aspect 11: The method of any of aspects 8 through 10, further comprising: receiving, from the second network entity, control signaling that indicates an index of the pilot signal, wherein: receiving the pilot signal comprises receiving, from the second network entity, a plurality of pilot signals comprising the pilot signal; other pilot signals of the plurality of pilot signals different than the pilot signal have different FDRSB characteristics than the one or more FDRSB characteristics of the pilot signal; and storing the one or more FDRSB characteristics of the pilot signal in the memory of the first network entity is based at least in part on the control signaling indicating the index of the pilot signal.

Aspect 12: The method of any of aspects 1 through 11, wherein the second signaling comprises physical layer signaling.

Aspect 13: A method for wireless communication at a second network entity, comprising: transmitting first signaling that indicates one or more FDRSB parameters associated with the second network entity, the one or more FDRSB parameters associated with an imbalance between an in-phase component of the first signaling and a quadrature phase component of the first signaling; generating second signaling that is configured to have one or more FDRSB characteristics; and transmitting the second signaling, wherein the second network entity is identifiable as a source of the second signaling based at least in part on the second signaling having the one or more FDRSB characteristics and further based at least in part the one or more FDRSB parameters indicated by the first signaling.

Aspect 14: The method of aspect 13, wherein the one or more FDRSB parameters comprise one or more filter parameters for decoding the second signaling based at least in part on filtering the one or more FDRSB characteristics of the second signaling.

Aspect 15: The method of any of aspects 13 through 14, wherein generating the second signaling comprises: deactivating, bypassing, or refraining from using a cancellation component configured to cancel the one or more FDRSB characteristics, wherein the second signaling is configured to have the one or more FDRSB characteristics based at least in part on deactivating, bypassing, or refraining from using the cancellation component.

Aspect 16: The method of any of aspects 13 through 14, wherein generating the second signaling comprises: removing one or more first FDRSB characteristics from the second signaling; and applying, before or after removing the one or more first FDRSB characteristics, the one or more FDRSB characteristics to the second signaling.

Aspect 17: The method of any of aspects 13 through 16, further comprising: generating third signaling that is configured to lack the one or more FDRSB characteristics; transmitting the third signaling; and transmitting control signaling that indicates a threshold difference between a first metric associated with the second signaling and a second metric associated with the third signaling, wherein the second network entity is identifiable as the source of the second signaling based at least in part on a difference between the first metric and the second metric being less than the threshold difference.

Aspect 18: The method of aspect 17, further comprising: receiving a message that indicates the difference between the first metric and the second metric.

Aspect 19: The method of any of aspects 17 through 18, wherein the control signaling comprises an RRC message or a MAC-CE.

Aspect 20: The method of any of aspects 13 through 16, wherein transmitting the first signaling comprises: transmitting a pilot signal, wherein the one or more FDRSB parameters comprise one or more FDRSB characteristics of the pilot signal, and wherein the second network entity is identifiable as the source of the second signaling based at least in part on a difference between the one or more FDRSB characteristics of the second signaling and the one or more FDRSB characteristics of the pilot signal being less than a threshold difference.

Aspect 21: The method of aspect 20, further comprising: transmitting control signaling that indicates an index of the pilot signal, wherein: transmitting the pilot signal comprises transmitting a plurality of pilot signals comprising the pilot signal; other pilot signals of the plurality of pilot signals different than the pilot signal are configured to have different FDRSB characteristics than the one or more FDRSB characteristics of the pilot signal; and the pilot signal is identifiable from among the plurality of pilot signals based at least in part on the index.

Aspect 22: The method of any of aspects 20 through 21, further comprising: transmitting an RRC message or a MAC-CE that indicates the threshold difference.

Aspect 23: The method of any of aspects 13 through 22, wherein the second signaling comprises physical layer signaling.

Aspect 24: An apparatus for wireless communication at a first network entity, comprising a processor; memory coupled with the processor; and instructions stored in the memory and executable by the processor to cause the apparatus to perform a method of any of aspects 1 through 12.

Aspect 25: An apparatus for wireless communication at a first network entity, comprising at least one means for performing a method of any of aspects 1 through 12.

Aspect 26: A non-transitory computer-readable medium storing code for wireless communication at a first network entity, the code comprising instructions executable by a processor to perform a method of any of aspects 1 through 12.

Aspect 27: An apparatus for wireless communication at a second network entity, comprising a processor; memory coupled with the processor; and instructions stored in the memory and executable by the processor to cause the apparatus to perform a method of any of aspects 13 through 23.

Aspect 28: An apparatus for wireless communication at a second network entity, comprising at least one means for performing a method of any of aspects 13 through 23.

Aspect 29: A non-transitory computer-readable medium storing code for wireless communication at a second network entity, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first network entity, comprising:
    one or more processors;
    memory coupled with the one or more processors; and
    instructions stored in the memory and executable by the one or more processors to cause the apparatus to:
        receive, from a second network entity different from the first network entity, first signaling that indicates one or more frequency domain residual sideband parameters indicative of one or more frequency domain residual sideband characteristics that identify transmissions from the second network entity, the one or more frequency domain residual sideband parameters associated with an imbalance between an in-phase component of the first signaling and a quadrature phase component of the first signaling;
        receive second signaling having the one or more frequency domain residual sideband characteristics that identify the transmissions from the second network entity;
        determine whether the second network entity is a source of the second signaling based at least in part on the one or more frequency domain residual sideband characteristics of the second signaling and the one or more frequency domain residual sideband parameters indicated by the first signaling; and
        communicate with the second network entity based at least in part on determining that the second network entity is the source of the second signaling.

2. The apparatus of claim 1, wherein the instructions are further executable by the one or more processors to cause the apparatus to:
    decode the second signaling based at least in part on the one or more frequency domain residual sideband parameters, wherein the one or more frequency domain residual sideband parameters comprise one or more filter parameters for decoding the second signaling based at least in part on filtering the one or more frequency domain residual sideband characteristics of the second signaling.

3. The apparatus of claim 2, wherein, to determine whether the second network entity is the source of the second signaling, the instructions are executable by the one or more processors to cause the apparatus to:
    determine whether the second network entity is the source of the second signaling based at least in part on comparing one or more characteristics of the decoded second signaling to one or more characteristics of signaling previously received from the second network entity.

4. The apparatus of claim 2, wherein the instructions are further executable by the one or more processors to cause the apparatus to:
    receive third signaling from the second network entity, the third signaling lacking the one or more frequency domain residual sideband characteristics;
    measure a first metric associated with the third signaling;
    measure a second metric associated with the second signaling after decoding the second signaling; and
    compare a difference between the first metric and the second metric with a threshold difference, wherein determining that the source of the second signaling is the second network entity is based at least in part on the difference being less than the threshold difference.

5. The apparatus of claim 4, wherein the instructions are further executable by the one or more processors to cause the apparatus to:
receive, from the second network entity, a radio resource control message or a medium access control-control element that indicates the threshold difference.

6. The apparatus of claim 4, wherein the instructions are further executable by the one or more processors to cause the apparatus to:
transmit, to the second network entity, a message that indicates the difference between the first metric and the second metric.

7. The apparatus of claim 4, wherein the first metric and the second metric are signal quality metrics.

8. The apparatus of claim 1, wherein:
to receive the first signaling, the instructions are executable by the one or more processors to cause the apparatus to receive a pilot signal, wherein the one or more frequency domain residual sideband parameters comprise one or more frequency domain residual sideband characteristics of the pilot signal; and
the instructions are further executable by the one or more processors to cause the apparatus to store the one or more frequency domain residual sideband characteristics of the pilot signal in a memory of the first network entity.

9. The apparatus of claim 8, wherein, to determine whether the second network entity is the source of the second signaling, the instructions are executable by the one or more processors to cause the apparatus to:
determine the one or more frequency domain residual sideband characteristics of the second signaling;
determine a difference between the one or more frequency domain residual sideband characteristics of the second signaling and the one or more frequency domain residual sideband characteristics of the pilot signal; and
determine that the second network entity is the source of the second signaling based at least in part on the difference being less than a threshold difference.

10. The apparatus of claim 9, wherein the instructions are further executable by the one or more processors to cause the apparatus to:
receive, from the second network entity, a radio resource control message or a medium access control-control element that indicates the threshold difference.

11. The apparatus of claim 8, wherein the instructions are further executable by the one or more processors to cause the apparatus to:
receive, from the second network entity, control signaling that indicates an index of the pilot signal, wherein:
receiving the pilot signal comprises receiving, from the second network entity, a plurality of pilot signals comprising the pilot signal;
other pilot signals of the plurality of pilot signals different than the pilot signal have different frequency domain residual sideband characteristics than the one or more frequency domain residual sideband characteristics of the pilot signal; and
storing the one or more frequency domain residual sideband characteristics of the pilot signal in the memory of the first network entity is based at least in part on the control signaling indicating the index of the pilot signal.

12. The apparatus of claim 1, wherein the second signaling comprises physical layer signaling.

13. An apparatus for wireless communication at a second network entity, comprising:
one or more processors;
memory coupled with the one or more processors; and
instructions stored in the memory and executable by the one or more processors to cause the apparatus to:
transmit, to a first network entity different from the second network entity, first signaling that indicates one or more frequency domain residual sideband parameters indicative of one or more frequency domain residual sideband characteristics that identify transmissions by the second network entity, the one or more frequency domain residual sideband parameters associated with an imbalance between an in-phase component of the first signaling and a quadrature phase component of the first signaling;
generate second signaling that is configured to have the one or more frequency domain residual sideband characteristics that identify the transmissions by the second network entity; and
transmit the second signaling, wherein the second network entity is identifiable as a source of the second signaling based at least in part on the second signaling having the one or more frequency domain residual sideband characteristics and further based at least in part on the one or more frequency domain residual sideband parameters indicated by the first signaling.

14. The apparatus of claim 13, wherein the one or more frequency domain residual sideband parameters comprise one or more filter parameters for decoding the second signaling based at least in part on filtering the one or more frequency domain residual sideband characteristics of the second signaling.

15. The apparatus of claim 13, wherein, to generate the second signaling, the instructions are executable by the one or more processors to cause the apparatus to:
deactivate, bypass, or refrain from using a cancellation component configured to cancel the one or more frequency domain residual sideband characteristics, wherein the second signaling is configured to have the one or more frequency domain residual sideband characteristics based at least in part on deactivating, bypassing, or refraining from using the cancellation component.

16. The apparatus of claim 13, wherein, to generate the second signaling, the instructions are executable by the one or more processors to cause the apparatus to:
remove one or more first frequency domain residual sideband characteristics from the second signaling; and
apply, before or after removing the one or more first frequency domain residual sideband characteristics, the one or more frequency domain residual sideband characteristics to the second signaling.

17. The apparatus of claim 13, wherein the instructions are further executable by the one or more processors to cause the apparatus to:
generate third signaling that is configured to lack the one or more frequency domain residual sideband characteristics;
transmit the third signaling; and
transmit control signaling that indicates a threshold difference between a first metric associated with the second signaling and a second metric associated with the third signaling, wherein the second network entity is identifiable as the source of the second signaling based at least in part on a difference between the first metric and the second metric being less than the threshold difference.

18. The apparatus of claim 17, wherein the instructions are further executable by the one or more processors to cause the apparatus to:
receive a message that indicates the difference between the first metric and the second metric.

19. The apparatus of claim 17, wherein the control signaling comprises a radio resource control message or a medium access control-control element.

20. The apparatus of claim 13, wherein, to transmit the first signaling, the instructions are executable by the one or more processors to cause the apparatus to:
transmit a pilot signal, wherein the one or more frequency domain residual sideband parameters comprise one or more frequency domain residual sideband characteristics of the pilot signal, and wherein the second network entity is identifiable as the source of the second signaling based at least in part on a difference between the one or more frequency domain residual sideband characteristics of the second signaling and the one or more frequency domain residual sideband characteristics of the pilot signal being less than a threshold difference.

21. The apparatus of claim 20, wherein the instructions are further executable by the one or more processors to cause the apparatus to:
transmit control signaling that indicates an index of the pilot signal, wherein:
transmitting the pilot signal comprises transmitting a plurality of pilot signals comprising the pilot signal;
other pilot signals of the plurality of pilot signals different than the pilot signal are configured to have different frequency domain residual sideband characteristics than the one or more frequency domain residual sideband characteristics of the pilot signal; and
the pilot signal is identifiable from among the plurality of pilot signals based at least in part on the index.

22. The apparatus of claim 20, wherein the instructions are further executable by the one or more processors to cause the apparatus to:
transmit a radio resource control message or a medium access control-control element that indicates the threshold difference.

23. The apparatus of claim 13, wherein the second signaling comprises physical layer signaling.

24. A method for wireless communication at a first network entity, comprising:
receiving, from a second network entity different from the first network entity, first signaling that indicates one or more frequency domain residual sideband parameters indicative of one or more frequency domain residual sideband characteristics that identify transmissions from the second network entity, the one or more frequency domain residual sideband parameters associated with an imbalance between an in-phase component of the first signaling and a quadrature phase component of the first signaling;
receiving second signaling having the one or more frequency domain residual sideband characteristics that identify the transmissions from the second network entity;
determining whether the second network entity is a source of the second signaling based at least in part on the one or more frequency domain residual sideband characteristics of the second signaling and the one or more frequency domain residual sideband parameters indicated by the first signaling; and
communicating with the second network entity based at least in part on determining that the second network entity is the source of the second signaling.

25. The method of claim 24, further comprising:
decoding the second signaling based at least in part on the one or more frequency domain residual sideband parameters, wherein the one or more frequency domain residual sideband parameters comprise one or more filter parameters for decoding the second signaling based at least in part on filtering the one or more frequency domain residual sideband characteristics of the second signaling.

26. The method of claim 25, wherein determining whether the second network entity is the source of the second signaling comprises:
determining whether the second network entity is the source of the second signaling based at least in part on comparing one or more characteristics of the decoded second signaling to one or more characteristics of signaling previously received from the second network entity.

27. The method of claim 25, further comprising:
receiving third signaling from the second network entity, the third signaling lacking the one or more frequency domain residual sideband characteristics;
measuring a first metric associated with the third signaling;
measuring a second metric associated with the second signaling after decoding the second signaling; and
comparing a difference between the first metric and the second metric with a threshold difference, wherein determining that the source of the second signaling is the second network entity is based at least in part on the difference being less than the threshold difference.

28. A method for wireless communication at a second network entity, comprising:
transmitting, to a first network entity different from the second network entity, first signaling that indicates one or more frequency domain residual sideband parameters indicative of one or more frequency domain residual sideband characteristics that identify transmissions by the second network entity, the one or more frequency domain residual sideband parameters associated with an imbalance between an in-phase component of the first signaling and a quadrature phase component of the first signaling;
generating second signaling that is configured to have the one or more frequency domain residual sideband characteristics that identify the transmissions by the second network entity; and
transmitting the second signaling, wherein the second network entity is identifiable as a source of the second signaling based at least in part on the second signaling having the one or more frequency domain residual sideband characteristics and further based at least in part on the one or more frequency domain residual sideband parameters indicated by the first signaling.

29. The method of claim 25, wherein the one or more frequency domain residual sideband parameters comprise one or more filter parameters for decoding the second signaling based at least in part on filtering the one or more frequency domain residual sideband characteristics of the second signaling.

30. The method of claim 25, wherein generating the second signaling comprises:
deactivating, bypassing, or refraining from using a cancellation component configured to cancel the one or more frequency domain residual sideband characteristics, wherein the second signaling is configured to have the one or more frequency domain residual sideband characteristics based at least in part on deactivating, bypassing, or refraining from using the cancellation component.

\* \* \* \* \*